US012506764B2

United States Patent
Walch et al.

(10) Patent No.: US 12,506,764 B2
(45) Date of Patent: Dec. 23, 2025

(54) EVENT AND RULE-BASED DYNAMIC SECURITY TEST SYSTEM

(71) Applicant: TARGET BRANDS, INC., Minneapolis, MN (US)

(72) Inventors: Caleb Walch, Minneapolis, MN (US); Eric Brandel, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 409 days.

(21) Appl. No.: 18/303,311

(22) Filed: Apr. 19, 2023

(65) Prior Publication Data

US 2023/0362187 A1    Nov. 9, 2023

Related U.S. Application Data

(60) Provisional application No. 63/338,146, filed on May 4, 2022.

(51) Int. Cl.
*H04L 9/40* (2022.01)
(52) U.S. Cl.
CPC ...... *H04L 63/1433* (2013.01); *H04L 63/1425* (2013.01); *H04L 63/20* (2013.01)
(58) Field of Classification Search
CPC .. H04L 63/1433; H04L 63/1425; H04L 63/20
See application file for complete search history.

(56) References Cited

U.S. PATENT DOCUMENTS

| | | | |
|---|---|---|---|
| 7,562,304 B2 | 7/2009 | Dixon et al. | |
| 8,752,183 B1 | 6/2014 | Heiderich et al. | |
| 9,015,844 B1 | 4/2015 | Franklin et al. | |
| 9,213,832 B2 | 12/2015 | Amit et al. | |
| 9,544,319 B2 | 1/2017 | Li et al. | |
| 9,565,202 B1 | 2/2017 | Kindlund et al. | |
| 10,205,742 B2 * | 2/2019 | Hansen | G06F 16/958 |
| 10,637,881 B2 | 4/2020 | Williams et al. | |
| 2012/0036580 A1 * | 2/2012 | Gorny | H04L 63/101 726/25 |
| 2018/0198807 A1 * | 7/2018 | Johns | H04L 63/1425 |
| 2021/0092146 A1 * | 3/2021 | Melson | H04L 63/1433 |

* cited by examiner

*Primary Examiner* — Thomas A Gyorfi
(74) *Attorney, Agent, or Firm* — Barnes & Thornburg LLP

(57) ABSTRACT

The disclosed technology provides for performing website anomaly tests by automatically checking whether a website is compromised by malicious code. A system can test dynamic behavior of the website indicating a functional user flow through the website. A set of rules can be applied against a log of the behavior and static code of the website to identify potential compromises. A first rule can be satisfied based on identifying patterns of plain text encodings in portions of website event data. A second rule can be applied to the portions of event data representing information transmitted from a client device to a third party device. The second rule can be satisfied based on identifying third party account information that is not included in a whitelist of allowed third party accounts information. A likelihood of potential security vulnerability can also be determined based on the first and/or second rules being satisfied.

20 Claims, 11 Drawing Sheets

EVENT AND RULE-BASED DYNAMIC SECURITY TEST SYSTEM

INCORPORATION BY REFERENCE

This application claims priority to U.S. Provisional Application Ser. No. 63/338,146, filed on May 4, 2022, the disclosure of which is incorporated by reference in its entirety.

TECHNICAL FIELD

This document generally describes technologies for a network security test of a network resource, such as websites.

BACKGROUND

A website vulnerability is a weakness or misconfiguration in website code that allows an attacker to breach one or more security mechanisms on the site, which can permit attackers to, for example, gain some level of control over or access to sensitive information on the site. There are several types of well-known website vulnerabilities that have been exploited by attackers, such as SQL injection vulnerabilities, cross-site scripting (XSS), command injection, file inclusion, and cross-site request forgery (CSRF). SQL injection vulnerabilities refer to areas in website code where direct input from a client device can be passed to a database. Bad actors utilize these forms to inject malicious code into a website's database, such as by injecting malicious/spam posts into a site, stealing customer information, or bypassing authentication to gain full control of the website. XSS occurs when attackers inject scripts through unsanitized user input or other fields on a website to execute code on the site. Browsers are unable to discern whether or not such cross-site scripts are intended to be part of the website, resulting in malicious actions being performed by cross-site scripts, such as session hijacking, spam content being distributed to unsuspecting visitors, and stealing session data. Command injection vulnerabilities allow attackers to remotely pass and execute code on the website's hosting server. File inclusion attacks use inclusion functions in server-side web application languages (e.g., PHP) to execute code from a remotely stored malicious file. CSRF attacks trick site users or administrators to unknowingly perform malicious actions for the attacker, such as changing order values and product prices, transferring funds from one account to another, or changing user passwords to hijack accounts.

Website administrators may manually analyze website code to identify vulnerabilities. For example, a website crawl and audit may be manually or automatically used to discover vulnerabilities by, for example, working statically with each link interacting with a server.

SUMMARY

The present disclosure relates to systems, methods, devices, and computer program products for network security tests, such as tests on website vulnerability (e.g., website anomaly due to potentially malicious code). The disclosed techniques can provide for a system that performs automated client-side testing of website and scripts loaded with website, including both static and dynamic analysis, to identify potential security threats. The system can include features to permit for real-time testing and alerting on identified issues. The system can also include features, such as rules, that can be applied to identify one or more forms of data exfiltration, including but not limited to plain text encoding of data and use of third party accounts.

The disclosed techniques can provide for analyzing events as they are logged at a client device (e.g., client computing device). For example, event data can be received, one or more security vulnerability rules can be retrieved for the particular type of the event, and the rules can be applied to the event data to determine whether a security vulnerability is present. Each event can be run against a set of differently selected/curated rules to determine whether the event represents a security vulnerability. Thus, security vulnerabilities can be assessed in real-time, instead of waiting until a stream or log of events is available for analysis. The disclosed techniques provides for validating a website as being secure or prompting an investigation into a potential security vulnerability in real-time as security vulnerabilities are identified.

The disclosed techniques may also provide for statistical analysis of network traffic to identify plain text encoding of data indicative of data exfiltration. For example, during runtime, textual and statistical analysis can be performed on data transmissions to identify abnormal combinations and/or patterns of characters (e.g., tabs and spaces in binary code, unusual occurrences of particular characters, etc.). Statistic spreads indicating expectations for different types of characters and combinations of characters can be used to determine when plain text data encoding may exist. Abnormal combinations and/or patterns of characters can indicate a security vulnerability and thus be reported as such.

The disclosed techniques further can provide for data exfiltration monitoring using whitelists of allowed third party account information. The system can monitor, during runtime and/or in real-time, data that enters and leaves third party accounts to determine whether those third party accounts match allowed values (e.g., user names, emails, IP addresses, etc.) in a whitelist. If a match is not identified, the system can identify potential malicious activity through the third party account. If a match is identified, the system can validate the transmission of data as secure.

Accordingly, the technologies described herein provide a system for automatically checking and detecting whether a website has been compromised by malicious third party scripts (and/or other types of scripts as described herein) based on a set of rules. The rules can be predetermined and applied against a static code of the website, and further against events generated by dynamic real-time testing of the website (e.g., detecting a functional user flow through the website), to expose vulnerabilities from third party scripts that have been secretly injected into trusted libraries on the website. In some implementations, website code can be loaded and evaluated in a runtime testing environment on a client device, which can simulate user processes on the website, such as potentially sensitive functional user flows like purchasing items in an online store, logging in to a user account, and accessing private account information. Such a runtime testing environment can capture and record the dynamic behavior of the website during these functional user flows on the website, and apply rules against the record of dynamic behavior of the website to detect the potential presence of malicious third party scripts.

The disclosed techniques can provide a variety of different rules and checks that are performed by a network security test system to determine whether a potential security anomaly exists. In some implementations, the network security test system can automatically test websites in their runtime environments (e.g., as loaded and interpreted on client devices) for the presence of malicious third party scripts, with the goal being to provide a security check that either validates the website as secure or prompts an investigation into the potential security anomaly. The network security test system can dynamically test a website in its runtime environment and monitor operations performed as part of the website while a functional user flow is performed on the website, such as an automated checkout process in an online store. Such dynamic tests can reveal vulnerabilities in a website that may not be apparent from static analysis. For example, the system can generate and run automation scripts on the website to simulate user interactions with the website (e.g., login, checkout process with payment information, etc.). The system can run the test without modifying the website code by copying and executing the code with the automation scripts in an isolated environment. As the automation scripts are run on the website, the system can log event behavior on the website.

Some embodiments of the network security test system can apply a set of rules against the website being dynamically scanned and logged, and/or against the static code of the website, and identify any malicious indicators to determine whether a potential security vulnerability (e.g., anomaly) exists. For example, the rules can be configured to examine website code itself by detecting indicators (e.g., strings or code snippets) in the website code that represent presence of obfuscation techniques, encryption libraries, masking techniques, and sensitive information requests in the website code. Such presence can indicate that malicious scripts are likely included in the website code, and further investigation may be required. In addition or alternatively, the rules can be configured to examine dynamic event data, which is created during the dynamic website test in runtime environments, by looking at network traffic per event and searching for known bad actors (e.g., scripts, domains, etc.) and/or unknown actors (e.g., scripts, domains, etc.) that have interacted with the website. Presence of known bad actors or unknown actors can be used as indicators for presence of malicious scripts, for which further investigation may be needed. In addition or alternatively, the rules can be configured to examine the dynamic behavior log by detecting indicators that can represent whether sensitive information (e.g., payment data, credentials, etc.) is requested and transmitted outside the website (e.g., to bad domains), whether content security policies (e.g., security policies implemented in browsers) are bypassed, whether information entered in sensitive information fields is intercepted, and/or whether script behavior is modified in the website when the website is being observed. Presence of such indicators from the dynamic event data can be used as indicators for presence of malicious scripts, for which further investigation may be needed.

Particular embodiments described herein include a method for testing a website for potential security vulnerabilities, the method including: retrieving, by a client device, website code of a website, executing, by the client device, the website code with automation script, the automation script simulating a user interaction with the website, monitoring, by the client device, dynamic event-based behavior of the website based on a functional user flow through the website from the simulated user interaction, generating, by the client device, event data for each of the monitored dynamic event-based behavior, applying, by the client device, a first rule to portions of the event data that represent information transmitted from the client device by the website code to a third party device, the first rule being satisfied based on identifying one or more patterns of plain text encodings in the portions of the event data, applying, by the client device, a second rule to the portions of the event data that represent information transmitted from the client device by the website code to the third party device, the second rule being satisfied based on identifying third party account information in the portions of the event data that is not included in a whitelist of allowed third party accounts information, determining, by the client device, a likelihood of a potential security vulnerability based on at least one of the first and second rules being satisfied, and outputting, by the client device, the likelihood of the potential security vulnerability and at least one of the associated first and second rules that were satisfied.

In some implementations, the method can optionally include one or more of the following features. For example, applying, by the client device, a first rule to portions of the event data that represent information transmitted from the client device by the website code to a third party device can include: accessing a list of plain text encoding indicators, accessing the portions of the event data, searching for one or more indicators in the portions of the event data that match any of the plain text encoding indicators in the list, and determining, based on identifying that at least one indicator is not present in the portions of the event data that match any of the plain text encoding indicators in the list, the likelihood of the potential security vulnerability in the website. The list can include a statistical spread indicating frequency of characters that appear in data transmissions for the website during a predetermined period of time. The characters can include white spaces and tabs. The characters can also include alphanumeric characters. The statistical spread can include frequency of sequences of characters that appear in the data transmissions for the website during the predetermined period of time. Moreover, the predetermined period of time can be a predetermined period of time before a present time.

In some implementations, searching, by the client device, for one or more indicators in the portions of the event data that matches any of the plain text encoding indicators in the list can include determining whether a frequency of a particular character appearing in a data transmission of the portions of the event data is within a predetermined range of a frequency of the particular character in the statistical spread. Sometimes, searching, by the client device, for one or more indicators in the portions of the event data that matches any of the plain text encoding indicators in the list can include determining whether a frequency of a particular character sequence appearing in a data transmission of the portions of the event data is within a predetermined range of a frequency of the particular character sequence in the statistical spread.

As another example, applying, by the client device, a second rule to the portions of the event data that represent information transmitted from the client device by the website code to the third party device can include: accessing the whitelist of allowed third party accounts information, accessing the portions of the event data, searching for one or more third party accounts in the portions of the event data that match any of the allowed third party accounts information in the whitelist, and determining, based on identifying that at least one third party account is not present in the portions of the event data that matches any of the allowed third party accounts information in the whitelist, the likelihood of the potential security vulnerability in the website.

In some implementations, the method can also include determining, by the client device, whether a size of data being transmitted by the one or more third party accounts in the portions of the event data exceeds an expected threshold size of data transmissions for the website. The method can also include returning, by the client device and based on determining that the size of data being transmitted exceeds the expected threshold size, an alert indicating the likelihood of the potential security vulnerability in the website.

As another example, the first and second rules can be applied, by the client device, in parallel. Moreover, the method can include monitoring, by the client device, a dynamic behavior of the website, generating, by the client device, a log of the dynamic behavior, applying, by the client device, a first set of rules to portions of the website code and a script of the website code, applying, by the client device, a second set of rules to source and destination information in the log of the dynamic behavior, applying, by the client device, a third set of rules to website behavior in the log of the dynamic behavior, determining, by the client device, a likelihood of a potential malicious script based on at least one of one or more rules of the first, second, and third sets of rules being satisfied, and outputting, by the client device, the likelihood of the potential malicious script and at least one of the associated one or more rules of the first, second, and third sets of rules that were satisfied. One or more rules in the first set of rules can be satisfied based on identifying at least one of one or more patterns of encryption, obfuscation, masking, and sensitive information requests in the portions of the website code and the script of the website code. One or more rules in the second set of rules can be satisfied based on identifying at least one of one or more known bad actors and unknown actors in the source and destination information. One or more rules in the third set of rules can be satisfied based on identifying at least one of one or more content security policy bypass, sensitive field event access, and script modification in the website behavior.

In some implementations, executing, by the client device, the website code can include hooking a group of attributes in runtime of the website. The group of attributes can include one or more of IP addresses being redirected, ports accessed, ongoing requests, incoming responses, data packets being transmitted, timing of the transmission, URLs of various resources to/from which requests/responses/data are transmitted, cookies, and downloads, other events occurring as a result of executing the website, function calls, messages, and network traffic.

Particular embodiments described herein can include a client computing device for testing a website security anomaly, the client computing device including: a data processing apparatus, and a memory device storing instructions that when executed by the data processing apparatus cause the device to perform operations that include: retrieving website code of a website, executing the website code with automation script, the automation script simulating a user interaction with the website, monitoring dynamic event-based behavior of the website based on a functional user flow through the website from the simulated user interaction, generating event data for each of the monitored dynamic event-based behavior, applying a first rule to portions of the event data that represent information transmitted from the client device by the website code to a third party device, applying a second rule to the portions of the event data that represent information transmitted from the client device by the website code to the third party device, determining a likelihood of a potential security vulnerability based on at least one of the first and second rules being satisfied, and outputting the likelihood of the potential security vulnerability and at least one of the associated first and second rules that were satisfied. The first rule can be satisfied based on identifying one or more patterns of plain text encodings in the portions of the event data. The second rule can be satisfied based on identifying third party account information in the portions of the event data that is not included in a whitelist of allowed third party accounts information.

In some implementations, the client computing device can optionally include one or more of the abovementioned features.

Particular embodiments described herein can include a non-transitory computer-readable medium having stored therein a program for causing a computer to execute a process of testing a website security anomaly, the process including: receiving a user input of a URL of a website, transmitting the URL to a web server to retrieve website code of the website, receiving website code of the website from the web server, the website code including a third party script, receiving the third party script from a third party script server different from the web server, executing the website code with automation script, generating simulated user inputs based on the automation script, monitoring dynamic event-based behavior of the website based on a functional user flow through the website from the simulated user inputs, generating event data for each of the monitored dynamic event-based behavior, applying a first rule to portions of the event data that represent information transmitted from the client device by the website code to a third party device, applying a second rule to the portions of the event data that represent information transmitted from the client device by the website code to the third party device, determining a likelihood of a potential security vulnerability based on at least one of the first and second rules being satisfied, and outputting the likelihood of the potential security vulnerability and at least one of the associated first and second rules that were satisfied. The first rule can be satisfied based on identifying one or more patterns of plain text encodings in the portions of the event data. The second rule can be satisfied based on identifying third party account information in the portions of the event data that is not included in a whitelist of allowed third party accounts information.

In some implementations, the non-transitory computer-readable medium can optionally include one or more of the abovementioned features.

The devices, system, and techniques described herein may provide one or more of the following advantages. For example, the disclosed techniques provide for identifying and addressing potential security vulnerabilities as they emerge in real-time and/or during runtime. This is possible since the disclosed system can analyze events as they are logged on the client device. Each event can be analyzed against a particular set of rules to determine whether the event represents a security vulnerability. Accordingly, security vulnerabilities can be assessed in real-time, instead of waiting until a stream or log of events are available for analysis. Event-based analysis, rather than analysis of logs full of events, can be a fast and accurate way to identify security vulnerabilities, especially since smaller curated sets of rules can be applied to each event in order to surgically identify a security vulnerability.

Similarly, analyzing each event with a curated set of rules can provide for accurately identifying security vulnerabilities and not letting security vulnerabilities go unnoticed. The set of rules to use against the event can be selected in a more surgical way, based on the type of event that is logged and analyzed during runtime. Since each event is analyzed with a curated set of rules specific to the event type, the rules are simple and fast to execute. The rules can be configured to screen potential malicious actors quickly, thereby enabling further manual or automated security investigation to be performed with more focused approach and in time and cost efficient ways. Moreover, since events can be analyzed as they come up and with a curated set of rules specific to the particular event, the disclosed techniques provide for live scanning of the website such that notifications can be generated (e.g., and transmitted to a backend server) about potential security vulnerabilities as the website is being scanned/tested. Thus, security analysts and/or another computing system (e.g., a backend security system) may not have to wait for a scan/test of the entire website to complete before determining and addressing potential security vulnerabilities. Reducing the amount of time needed to determine whether there are potential security vulnerabilities provides for quicker diagnosis of and response to actual security threats.

As another example, some embodiments described herein include a system that automates dynamic testing of a functional user flow through a website (e.g., a checkout page) to expose potentially malicious code from third party scripts or other types of scripts. Therefore, the system can reveal any suspicious behavior on a website resulting from malicious scripts that have been secretly injected into trusted libraries on the website in a way that is not apparent from static analysis (e.g., due to obfuscation of the third party scripts). Such identification of malicious third party scripts affecting a website may otherwise not be possible, and may be a point of uncertainty, for website owners and managers regarding website security, especially when the website owners and managers rely on static analysis of the website. For example, dynamic statistical analysis of character patterns in data transmissions can provide for quick detection of security vulnerabilities during runtime that otherwise may go undetected when using static analysis techniques. The disclosed technology can therefore assist in verifying that a website is free of such malicious third party scripts, and can also aid in detecting and neutralizing potential threat vectors when they exist.

In another example, the network security system can permit for automation scripts to be generated and run with website code in an isolated environment. Further, such automation scripts can simulate dynamic behavior of the website as if a user interacts with checkout page or other secured pages on the website. Therefore, security analysis of a website can be performed without affecting actual client devices that interact with the website.

In yet another example, the system herein can log the dynamic behavior associated with events of the website, and generate a report that can be used to identify any potentially malicious code on the website. The log can be used as a reliable source to identify any anomalies in the behavior of the website that can result from malicious third party scripts on the website. The reports can be used for further investigation of any identified anomalies.

Moreover, the system herein can perform further attribution against scripts (e.g., first party scripts, third party scripts, etc.) by analyzing the event data from the website. Some examples of behavior captured in the event data can include modifying strings of characters in data transmissions, logging data across unknown or unauthorized third party accounts, dynamically loading additional scripts, adding third-party trackers, listening and recording keyboard events, adding or modifying elements on the webpage, and creating HTML elements that make network requests to third-party servers.

In another example, the example rules described herein may be implemented in a well-known programming language, in order to take advantage of the expressiveness and standards provided by this approach.

In yet another example, the example rules described herein can be updated on the fly for rapid response to the emergence of new threats by the usage of a user interface to enable creation and edit of the rules.

In another example, the example rules described herein can be updated programmatically via integrations with other network monitoring systems that can then feed new known threats automatically to the rules running in the system.

The details of one or more implementations are set forth in the accompanying drawings and the description below. Other features and advantages will be apparent from the description and drawings, and from the claims.

DETAILED DESCRIPTION OF ILLUSTRATIVE EMBODIMENTS

In general, the technologies described herein provide systems, methods, devices, and computer program products for network security tests, such as website vulnerability tests for, e.g., website anomaly due to potentially malicious code. The disclosed techniques can provide for run time testing and analysis of websites on client devices, statistical analysis of network traffic to identify abnormal combinations or patterns of characters indicating of encoding, and data exfiltration monitoring using whitelists of approved third party account information. Moreover, the technologies described herein can provide a system for automatically checking and detecting whether a website has been compromised based on a set of rules. The rules can be predetermined and applied against static code of the website, and further against event data generated by dynamic real-time testing of the website (e.g., detecting a functional user flow through a website), to expose potentially malicious code from third party scripts (and/or other types of scripts, such as first party scripts) that have been secretly injected into trusted libraries on the website. Although the technologies are described herein primarily with examples of third party scripts, it is understood that the technologies can be applied in the same or similar manners to other types of scripts such as first party scripts that may contain malicious code.

Figure 1:
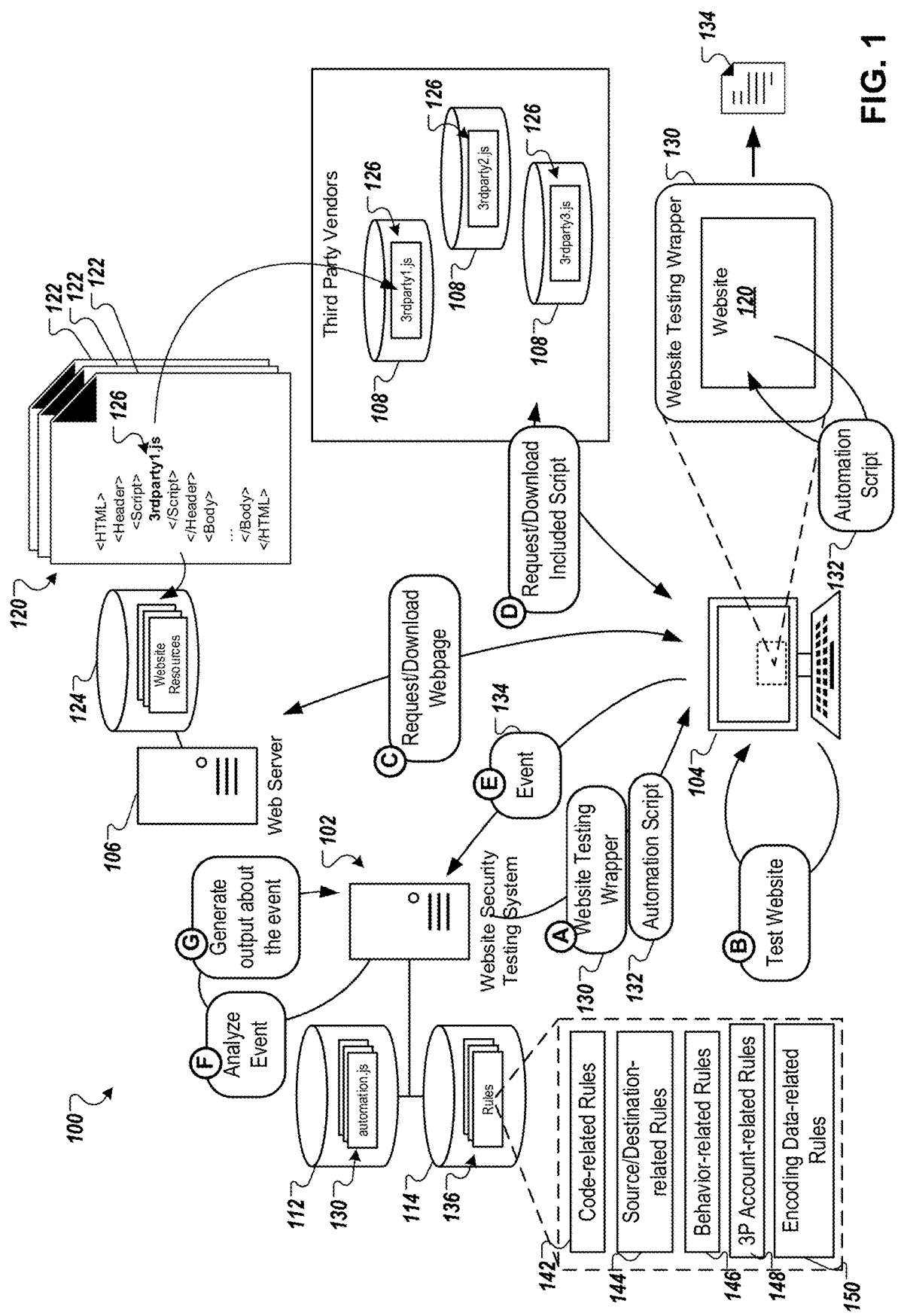
FIG. 1 is a block diagram of an example network architecture for website vulnerability testing.

FIG. 1 is a block diagram of an example network architecture 100 for website vulnerability testing of the present disclosure. The network architecture 100 includes a website security test system 102, a test client device 104, a web server 106, and a third party script server 108. The entities in the network architecture 100, such as the website security test system 102, the test client device 104, the web server 106, and the third party script server 108, are communicatively coupled to one or more networks.

The website security test system 102 stores and manages a website test tool, such as a website testing wrapper 130. The website security test system 102 can transmit the website test tool to the test client device 104 for anomaly testing as described herein. The website security test system 102 can manage a plurality of automation scripts that are stored in an automation scripts database 112. In addition, the website security test system 102 can manage one or more security testing rules 136 stored in a testing rules database 114. Testing rules can be used to analyze static website code (e.g., website source code), and/or events of dynamic behavior of websites, and determine any malicious code detected.

The test client device 104 is used to access a website (e.g., one or more webpages thereof) from the web server 106 and perform tests of the website. The test client device 104 can be dedicated for security vulnerability (e.g., anomaly) testing for websites. For example, the test client device 104 can be a computing device only for the website security testing described herein, and is not an actual client device in the network (e.g., a network client or host). In alternative implementations, an actual network client device can be used as the test client device 104. The test client device 104 can provide an isolated environment for such testing. The test client device 104 can be a physical computing device, a virtual machine, or any other systems that can provide isolated runtime environments for websites.

The test client device 104 can run a web browser for a user to access the website being tested. In addition or alternatively, the test client device 104 can execute a website testing tool (e.g., the website testing wrapper) to perform anomaly testing on the website.

The web server 106 operates to host one or more webpages 122 of a website 120. The web server 106 connects to a website resources database 124 storing code (e.g., HTML, scripts (e.g., JavaScript), style sheets, server-side code, client-side code, etc.) that the web server 106 executes and/or distributes to provide the webpages 122 on client devices. The webpages 122 can be considered to collectively be a website 120 that is hosted by the web server 106.

A website is a collection of network web resources, such as static assets (images, fonts, embedded videos, HTML, JavaScript, style-sheets, etc.), and server-side code which are typically identified with a common domain name and published on a web server. A website can be of various types, such as a static website and a dynamic website (also referred to as a web application). A static website has web pages stored on the server in the format that is sent to a client web browser. It may be coded in Hypertext Markup Language (HTML) and Cascading Style Sheets (CSS) used to control appearance beyond basic HTML. Images are commonly used to affect the desired appearance and as part of the main content. Audio or video might also be considered static content if it plays automatically or is generally non-interactive. This type of website usually displays the same information to all visitors. A dynamic website (or a web application) is a website that changes or customizes itself frequently and automatically. Server-side dynamic pages are generated on the fly by computer code that produces the HTML with CSS. There are a wide range of software systems, such as CGI, Java Servlets and Java Server Pages (JSP), Active Server Pages, Node.js, and ColdFusion (CFML), which are available to generate dynamic web systems and dynamic sites.

By way of example, an example of a website to be tested for the presence of malicious code may be an online shopping website in which a user connects to the website through a web browser, and save shopping items in a shopping cart, sign in the user's account by entering a username/password combination, and/or check out with payment. The automation script, when executed, can simulate such user interaction with the website.

The third party script server 108 operates to host one or more third party scripts 126 that can be included in a website 120. The third party script server 108 can be separate from the web server 106 and can provide scripts to be directly embedded to the website hosted by the web server 106.

Third party scripts 126 are scripts (e.g., JavaScript) that can be embedded into a website directly from third-party vendors. Third party scripts 126 may provide a range of functionalities that make a website more dynamic and interactive, and/or generate a revenue stream. Such scripts can include ads, analytics, widgets and other suitable scripts for other functionalities. Examples of third-party scripts include social sharing buttons (e.g., Twitter, Facebook, G+, etc.), video player embeds (e.g., YouTube, Vimeo, etc.), advertising iframes, analytics & metrics scripts, A/B testing scripts for experiments, helper libraries (e.g., date formatting, animation, functional libraries, etc.).

By way of example, where a website is an online shopping website including login, checkout, payment, and other sensitive processes, many third party scripts can be downloaded and run with the website code. As described herein, malicious code can be injected into the source code. For example, third party scripts for payment process can be compromised with malicious code for scrapping user's sensitive data (e.g., credit card information) by listening to user's keystrokes. In addition or alternatively, attackers can create malicious scripts and inject them into the website directly. Numerous third party scripts can be embedded in website code in such a way that they look like part of normal website code without revealing any overtly malicious intent. Therefore, static code analysis does not identify all of such scripts until the scripts are actually executed on client devices. As described herein, dynamic analysis described herein can monitor and log the behavior of a website with third party scripts embedded therein when the website is run through a web browser (and/or the website testing wrapper) on a client device.

Referring still to FIG. 1, an overall process for dynamic testing of websites for anomalies is described. In Step A, the website security testing system 102 can transmit a website testing wrapper 130 and an automation script 132 to the test client device 104 so that anomaly testing can be performed for a website 120 that has been identified to be tested for the presence of anomalous code.

The website testing wrapper 130 is code designed to test a website in the test client device 104 with no or little modification of the website code. As described herein, the web site testing wrapper 130 can execute the automation script 132 on the website code, and generate event data 134 indicating behavior of the website in response to the automation script 132 and actions performed in the website 120.

The automation script 132 is a script that automatically simulates a series of actions or inputs of a user that interact with a target website. The automation script 132 can include operation of elements of the target website, modification of attributes of the elements, changes to the location of the elements in a document object model (DOM), and any other suitable actions against the target webpage. Such elements can be based on events that result from user interaction with a web browser. In some implementations, the automation script 132 can be derived from a functional test script to test for the presence of anomalous code.

The automation script 132, which is suitable for testing the target website 120, can be selected and retrieved from a plurality of automation scripts stored in the database 112. Alternatively, the automation script 132 can be created and/or formatted to be executable with the website 120 on the test client device 104.

In Step B, the test client device 104 operates to test the website 120, which causes the test client device 104 to request and download the webpages (Step C), and further to request and download the third party scripts and resources included in the webpages (Step D).

In Step C, the test client device 104 transmits a request for the website 120 to the web server 106. The web server 106 transmits the requested website 120 to the test client device 104, and the test client device 104 downloads the website 120 (e.g., webpages 122 thereof) from the web server 106.

In Step D, the test client device 104 transmits a request for the third party scripts 126 included in the webpages 122 to the third party script servers 108, which then transmits the requested third party scripts 126 back to the test client device 104. The test client device 104 downloads the third party scripts 126 from the third party script servers 108.

During the testing process (Step B), the webpages 122 including the third party scripts 126 can be accessed and presented with the website test wrapper 130, which can execute the automation script 132. The automation script 132 provides simulated user inputs to interact with the webpages 122. The website test wrapper 130 can generate event data 134 that records responses at the webpages 122 from the simulated user inputs that are provided by the automation script 132.

In Step E, the test client device 104 transmits the event data 134 to the website security testing system 102. The test client device 104 can transmit the event data 134 in real-time, as it is generated. In some implementations, the test client device 104 can transmit multiple event data 134 in a batch. The event data 134 can include various pieces of information indicative of a dynamic behavior of the webpages 122, which can include a functional user flow through the webpages 122 resulting from the simulated user interaction with the webpages 122. For example, the event data 134 can include information about function calls, messages, network traffic, data packets, cookies, downloads, and other data indicative of the website behavior during a particular event. The event data 134 can also include JavaScript files and/or whatever other scripts are run on the webpages 122.

In Step F, the website security testing system 102 can be used to analyze the event data 134 to identify any malicious behavior of the website 120. The website security testing system 102 can automatically scan and analyze the event data 134, and identify any abnormal or malicious behavior and/or compromised source code. Alternatively or in addition, a security administrator (e.g., a security analyst) can manually review the event data 134, and identify any abnormal or malicious behavior of the website 120 and/or determine if any of the source code has been compromised. In addition to analyzing the event data 134, the website security testing system 102 can analyze the code (e.g., static code) of the website 120 (e.g., the code stored in the database 124).

In some implementations, the identification of anomalous behavior and/or compromised scripts can be performed based on one or more testing rules 114. The website security testing system 102 can select which of the testing rules 114 to apply based on a type of the event data 134 (e.g., refer to FIG. 4). The testing rules 114 can be designed to identify abnormal or suspicious code (e.g., scripts) in a website, and detect behavior of the website that differs from a predetermined sequence of a behavior of a website that interacts with a normal user input. In some implementations, the testing rules 114 can be implemented in one or more rule engines. Each of the rule engines can run as a microservice and can maintain a local cache. The local cache can include a set of information stored in memory that is used by the respective rule engine to apply one or more rules to website code and/or the event data 134. In some implementations, if multiple rule engines are run against the event data 134 and/or multiple event data, the rule engines can be executed in parallel without blocking each other or otherwise clogging network bandwidth and compute resources. As a result, analysis of a website can be performed quickly and efficiently.

In some implementations, the rules 114 include code-related rules 142, source/destination-related rules 144, behavior-related rules 146, third-party account-related rules 148, and/or encoding data-related rules 150. For example, presence of a potential malicious script can be determined by applying the code-related rules 142 against the code of the website 120, applying the source/destination-related rules 144 against the event data 134, applying the behavior-related rules 146 against the event data 134, applying the third-party account-related rules 148 against the event data 134, and/or applying the encoding data-related rules 150 against the event data 134.

The code-related rules 142 can be applied against static code of the website and configured to search for indicators (e.g., strings or code snippets) of malicious actors in the website code. For example, the code-related rules 142 can be used to identify indicators representative of presence of obfuscation techniques, encryption libraries, masking techniques (e.g., jQuery Mask), and sensitive information requests in the website code. Such rules 142 can also be applied against the event data 134 to determine whether, in a particular event, there is a potential security vulnerability.

The source/destination-related rules 144 can be applied against the event data 134 and configured to search for known bad actors and/or unknown actors that interact with the website in network traffic recorded in the event data 134. Presence of known bad actors or unknown actors can be used as indicators for presence of malicious scripts, for which further investigation may be needed.

The behavior-related rules 146 can be applied against the event data 134 and configured to search for indicators that can represent whether sensitive information (e.g., payment data, credentials, etc.) is requested and transmitted outside the website (e.g., to bad domains), whether content security policies (e.g., security policies implemented in browsers) are bypassed, whether information entered in sensitive information fields is intercepted, and/or whether script behavior is modified in the website when the website is being observed. Presence of such indicators identified from the event data 134 can be used as indicators for presence of malicious scripts, for which further investigation may be needed.

The third-party account-related rules 148 can be applied against the event data 134 and configured to search for data traffic between third party accounts that are known and included in a whitelist of allowed third party accounts information. Identification of third party accounts that do not match values in the whitelist can be used as indicators for presence of security vulnerabilities, for which further investigation may be needed.

The encoding data-related rules 150 can be applied against the event data 134 and can be used to identify indicators representative of presence of data exfiltration techniques in event data. These indicators can therefore be used to determine presence of security vulnerabilities, for which further investigation may be needed.

Finally, in Step G, the website security testing system 102 generates output about the analyzed event data 134. For example, based on applying the rules 114 to the event data 134, the website security testing system 102 can identify a security vulnerability with the event data 134. The website security testing system 102 can accordingly generate a notification, message, or other form of output that can be provided to a security analyst prompting further investigation in step F. As another example, if the website security testing system 102 does not identify a security vulnerability with the event data 134, the website security testing system 102 can generate a notification, message, or other form of output that can be provided to a security analyst indicating that the website 120 is validated and/or the particular event data 134 is validated (e.g., there are no current security vulnerabilities detected). In some implementations, the website security testing system 102 may generate output only when a security vulnerability is identified in the event data 134.

In some implementations, one or more of the steps described in FIG. 1 can be performed at different components in the network architecture 100. For example, the test client device 104 can analyze the event data 134 in Step F and generate output about the analyzed event data 134 in Step G. Thus, analysis of event data and websites for security vulnerabilities can be performed at the test client device 104 (e.g., client-side) rather than another system and/or server. As a result, detection of security vulnerabilities can be performed quickly and efficiently using the computing resources and processing power of the test client device 104. In other words, analysis can be performed during runtime at the test client device 104 using real-time rule-based selection and analysis to instantaneously alert on potential security vulnerabilities.

The steps described in FIG. 1 can be performed multiple times a day and/or at predetermined time intervals for every website that may be accessed at a client computing device (e.g., every 15 minutes). More frequent testing of the website and analysis of individual events can be beneficial to quickly diagnose, catch, and respond to potential security vulnerabilities. Moreover, as described herein, the steps in FIG. 1 can be performed to walk through a user flow at a website, such as selecting an item for purchase, adding the item to a virtual cart, purchasing the item, and/or logging into a user account. The steps described in FIG. 1 can be used to flag potential security vulnerabilities in any website, which can be reviewed by a security analyst and/or another computing system to determine whether there in fact is a security threat that should be addressed.

Figure 2:
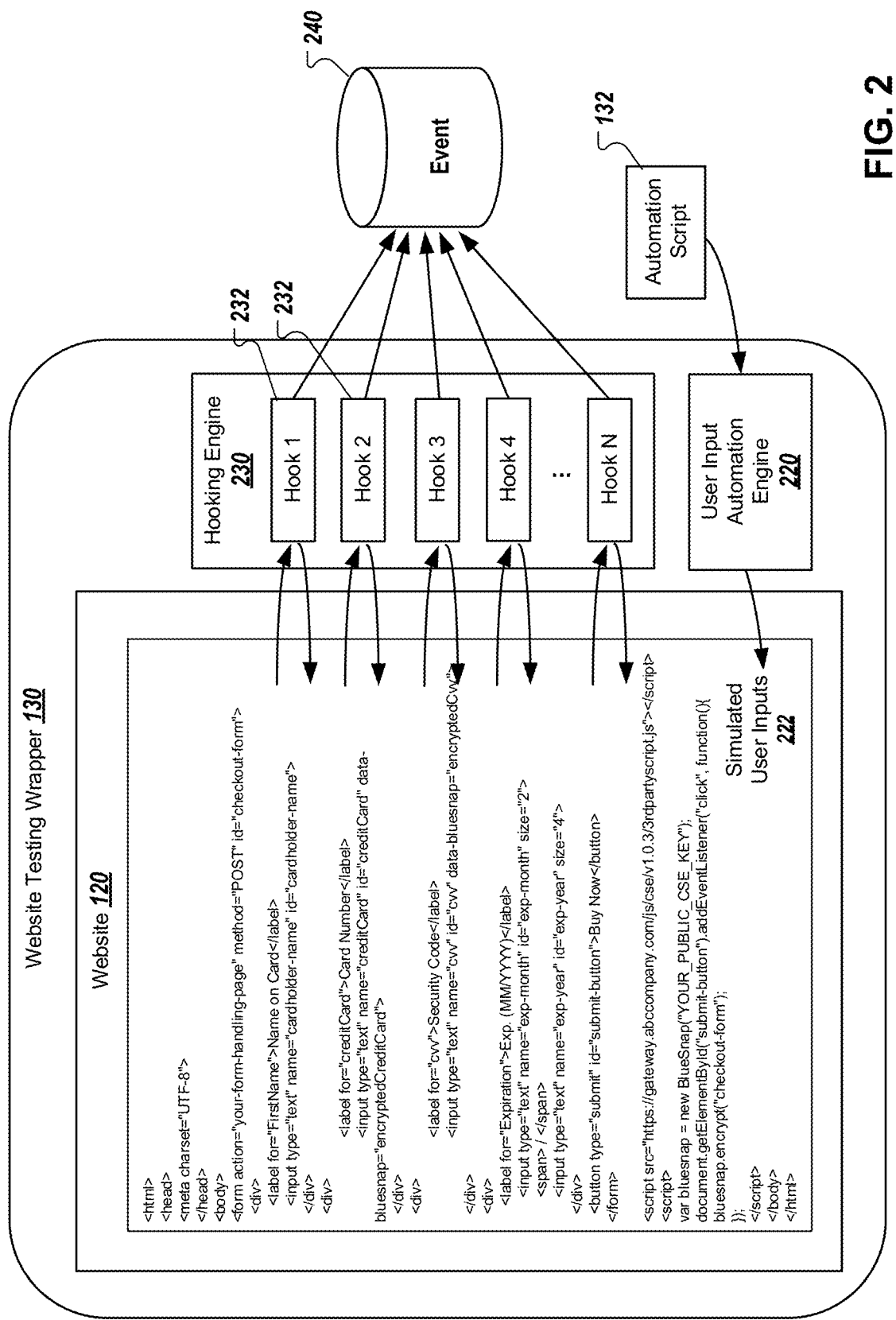
FIG. 2 illustrates an example method of performing dynamic security test of a webpage.

FIG. 2 illustrates an example method 200 of performing dynamic security test of a webpage 210. A webpage 210 can be one of the webpages 122 of the website 120 described in FIG. 1. The webpage 210 can be retrieved from a web server (e.g., the web server 106) and tested in the website testing wrapper 130 at a client device (e.g., the test client device 104).

The website testing wrapper 130 can include a user input automation engine 220 configured to simulate user inputs to the webpage 210. For example, the user input automation engine 220 can generate simulated user inputs 222 based on the automation script 132, and enable the simulated user inputs 222 to interact with the webpage 210.

The website testing wrapper 130 can monitor the dynamic behavior of the webpage 210. The dynamic behavior of the webpage 210 can include information indicative of a functional flow in response to the simulated user inputs 222. In some implementations, the website testing wrapper 130 can include a hooking engine 230 configured to monitor the behavior of the webpage being tested. For example, the hooking engine 230 is configured to intercept various operations performed in runtime of the webpage, which can include functional aspects of the webpage, such as function calls, messages, events, etc. that occur in the runtime of the webpage. The hooking engine 230 includes one or more hooks 232. Hooks 232 are code that handle such intercepted aspects (e.g., function calls, messages, events, etc.).

The hooking engine 230 of the website testing wrapper 130 can generate event data 240 that record the monitored behavior of the webpage 210 as it occurs in real-time. The event data 240 can be the event data 134 in FIG. 1. The event data 240 can be used to identify any anomalies in the behavior of the webpage that may result from malicious third party scripts embedded in the webpage. Moreover, as described herein, the event data 240 can be collected during runtime as events occur in real-time. The event data 240 can then be analyzed using the disclosed techniques, either at the client device or at a website security testing system to identify potential security vulnerabilities in the webpage 210.

Figure 3:
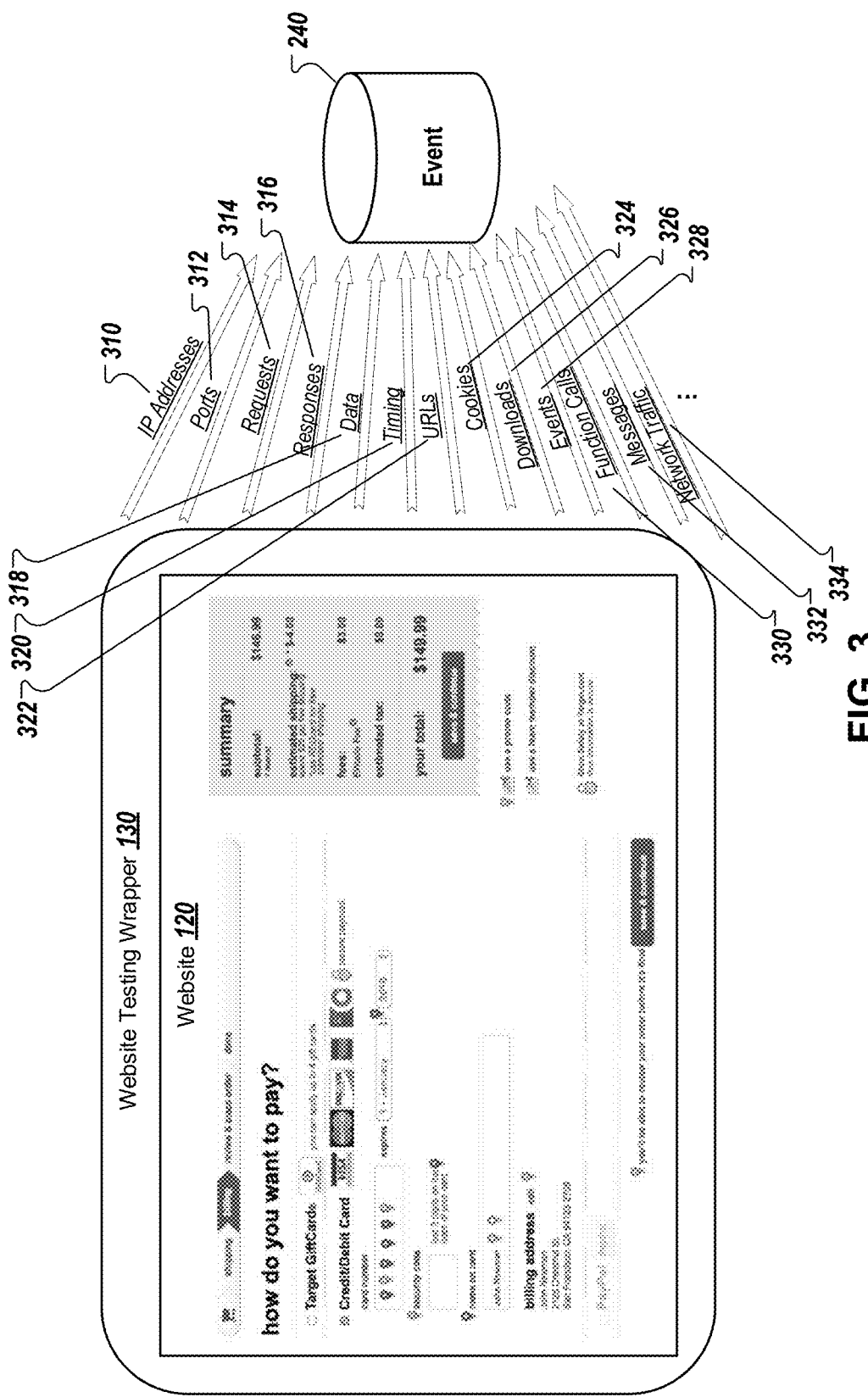
FIG. 3 illustrates example attributes that represent the dynamic behavior of a webpage being tested and is recorded as log data.

FIG. 3 illustrates example attributes that represent the dynamic behavior of a webpage being tested, and is recorded as the event data 240. The event data 240 can be used as a source to identify any anomalies in the behavior of the website 120 that can result from malicious third party scripts on the website 120 or other security vulnerabilities. The event data 240 can be used to generate a report with which security administrators (e.g., security analysts) can further investigate and mitigate vulnerabilities of the website 120. Reports or notifications can be generated in real-time about each of the event data 240 while the website 120 is being analyzed. This can provide for quick and accurate diagnosis and addressing of security vulnerabilities in the website 120.

Various attributes can be obtained from the runtime test of the website 120 described herein. Examples of such information include IP addresses 310 being redirected, ports 312 accessed, ongoing requests 314, server responses 316, data packets 318 being transmitted, timing 320 of the transmission, URLs 322 of various resources to/from which requests/responses/data are transmitted, cookies 324, and downloads 326, other events 328 occurring as a result of executing the website 120, function calls 330, messages 332, network traffic 334, and other pieces of information that are monitored during the runtime test of the website 120.

Network traffic can be monitored by measuring various attributes of traffic, such as amount of traffic, type of traffic (e.g., web traffic, mail traffic, file transfer traffic, infrastructure traffic, remote control traffic, etc.), encoding of data, IP addresses (e.g., IP addresses of network devices, servers, clients, applications, etc.), ports accessed, protocols, bandwidth, etc. Network traffic can be analyzed by a packet sniffer. A packet sniffer can, for example, intercepts and logs traffic passing over a network by capturing each packet.

A data packet is a formatted unit of data being transmitted to a network. A data packet includes payload and control information, which provides data (e.g., source and destination network addresses, error detection codes, and sequencing information) for delivering the payload. Control information can be found in packet headers and trailers.

A cookie is a small piece of data sent from the website 120 and stored on a user's computing device (e.g., the test client device 104 or another client computing device) by the web browser while the user is browsing. Cookies are designed to permit for websites to remember stateful information (e.g., items added in a shopping cart in an online store) and/or to record the user's browsing activity (e.g., clicking buttons, logging in, recording visited pages, etc.). Cookies can further be used to record arbitrary pieces of information that the user has previously entered into form fields, such as names, addresses, passwords, and credit card numbers.

Cookies have various types, such as session cookies, persistent cookies, secure cookies, http-only cookies, samesite cookies, third-party cookies, supercookies, etc. Further, authentication cookies are cookies used by web servers to know whether the user is logged in or not, and which account they are logged in with. Authentication cookies allow the site to know whether to send a page containing sensitive information, or require the user to authenticate themselves by logging in. The security of an authentication cookie generally depends on the security of the issuing website and the user's web browser, and on whether the cookie data is encrypted. Security vulnerabilities may allow cookie's data to be read by a hacker, used to gain access to user data, or used to gain access (with the user's credentials) to the website to which the cookie belongs. Tracking cookies, such as third-party tracking cookies, are used as ways to compile long-term records of individuals' browsing histories.

Messages can include inputs generated by a system (e.g., an operating system on the test client device 104) and applications (e.g., a web browser launching the website 120 being tested). A system can also generate messages in response to changes in the system brought about by an application. Further, a system can use messages to control the operations of applications and to provide input and other information for applications to process. An application can generate messages to perform tasks or communicate with other applications.

An event is an action or occurrence that may originate asynchronously from an external activity that needs to be handled by a program. An event is an entity that can encapsulate an action and contextual variables triggering the action. Events can be generated or triggered by a system, by a user, and/or in other ways. Events can be handled synchronously with a program flow. For example, software may have one or more dedicated places where events are handled, such as an event loop. A source of events (e.g., external activity) can include a user who may interact with the software by way of, for example, keystrokes on a keyboard. Another source can be a hardware device such as a timer. Software can also trigger its own set of events into the event loop to, for example, communicate completion of a task.

The events can include user generated events, such as mouse events, keyboard events, joystick events, touchscreen events, and device events. For example, a pointing device can generate software recognizable pointing device gestures. A mouse can generate a number of mouse events, such as mouse move (e.g., direction of move and distance), mouse button controls, mouse wheel motion, or any combination thereof. Further, pressing a key, or a combination of multiple keys, on a keyboard generates a keyboard event, which causes a currently running program to respond to data introduced by the keystroke. Moving a joystick generates an X-Y analogue signal, which generates a joystick event. A joystick can have one or more buttons which also generate an event when pressed. A user interaction with a touchscreen can generate events, which can be referred to as touch events or gestures. Action by or to a device, such as a shake, tilt, rotation, move, etc., can also generate device events.

Figure 4:
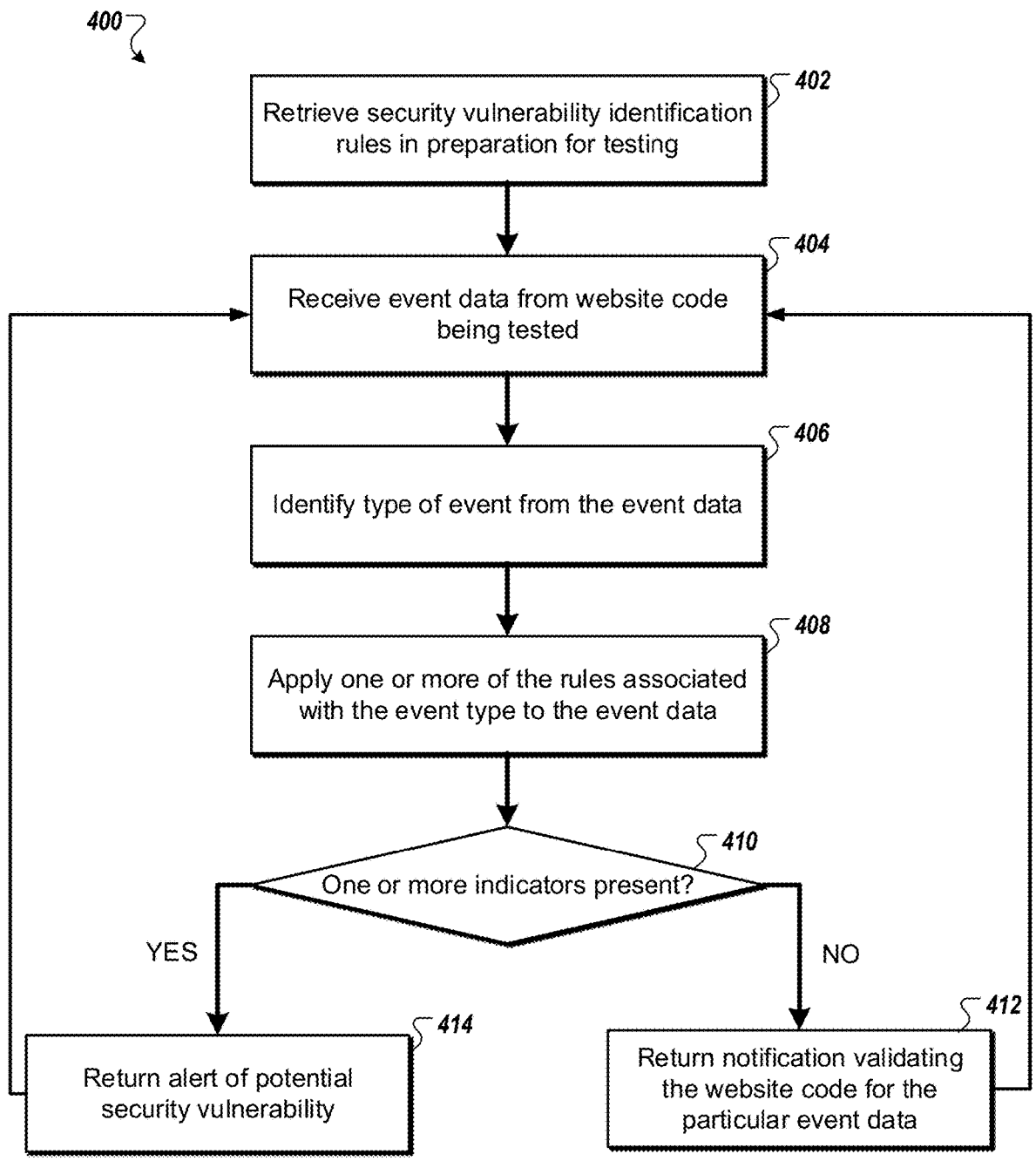
FIG. 4 is a flowchart of a process for validating website code.

FIG. 4 is a flowchart of a process 400 for validating website code. The process 400 can be performed for each event that is generated and logged when a website is tested at a test client device (e.g., the test client device 104 in FIG. 1). As a result, event data can be analyzed in real-time while the entire website is being scanned/testing. This can provide for instantaneous identification of potential security vulnerabilities, which can further be beneficial to appropriately catch and address security vulnerabilities. When multiple events are logged at a same time, the process 400 can also be executed multiple times in parallel to avoid blocking network bandwidth and/or clogging compute resources.

The process 400 can be performed during runtime and can be client-side. In other words, the process 400 can be performed by a client device, such as the test client device 104 depicted and described in FIG. 1. The process 400, and/or blocks in the process 400, can also be performed by another computer system, cloud-based service, and/or network of computers and/or devices, such as the website security testing system 102 in FIG. 1. For illustrative purposes, the process 400 is described from the perspective of a computer system.

Referring to the process 400, the computer system can retrieve security vulnerability identification rules in preparation for testing in 402. In some implementations, one or more sets of rules can be preloaded in memory of the computer system for quick retrieval during the process 400. In some implementations, a variety of rules can be preloaded and stored in memory of the computer system. In yet some implementations, the computer system can access one or more rule engines that are configured to executed one or more rules and/or one or more sets of rules. As an illustrative example, where the computer system is a client computing device, the client computing device can load one or more rules into a local cache (e.g., memory) for quick and easy access. As a result, during processing, network bandwidth and compute resources may not be clogged.

The computer system can receive event data from website code that is being tested in 404. As described throughout this disclosure, while the website is being tested, events can be triggered. The events can include actions performed by or responses to a user flow. The events can include accessing one or more pieces of data, clicking on tabs or other objects in the website, adding an item to a shopping cart in an online store, logging into a user account, adding payment information, etc. Once an event is triggered, associated event data can be transmitted to the computer system. Therefore, the computer system can receive event data in real-time while the website code is still being tested. In an illustrative example where the computer system is a client computing device, the client computing device may identify the event data (e.g., instead of receiving the event data) and then proceed with the following blocks in the process 400. In some implementations, block 404 can be performed before retrieving security vulnerability rules in 402, while retrieving the rules, or after retrieving the rules.

Next, the computer system can identify a type of event from the event data in 406. Each event captured by the computer system can be categorized and tagged with an event type as the event is created.

The computer system can then apply one or more of the rules associated with the event type to the event data (408). The computer system can select one or more of the rules that were retrieved in 402 based on the identified event type. Thus, the computer system can surgically select a curated set of rules that can be applied to the particular event data instead of applying all of the rules to the event data. The selected rules can then be applied to the event data to quickly and accurate identify potential security vulnerabilities associated with the event data. Refer to FIGS. 5-9 for further discussion about applying the rules to the event data.

Figure 5A:
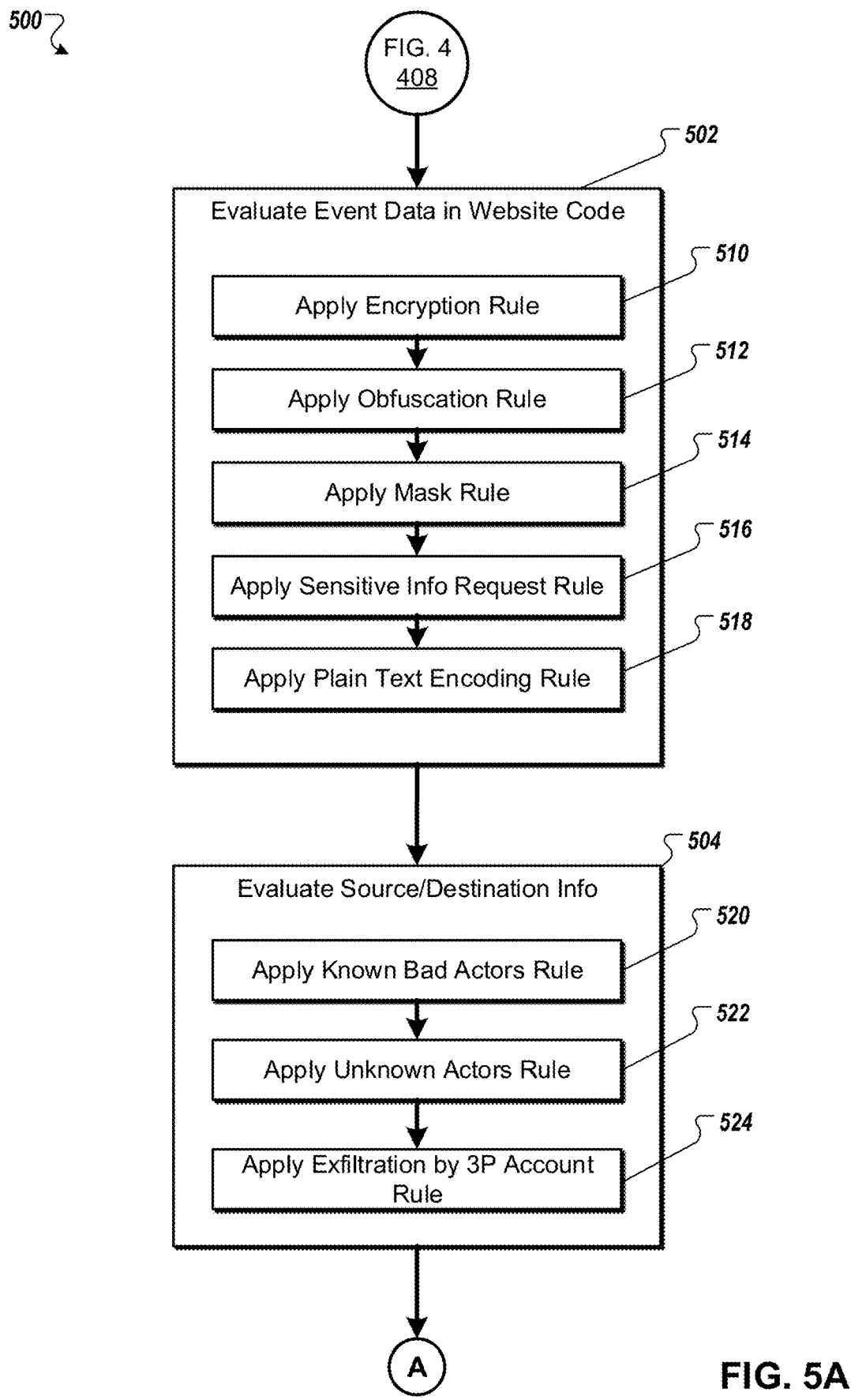
FIGS. 5A-B is a flowchart of a process for identifying presence of a security vulnerability in event data in a website.
Figure 5B:
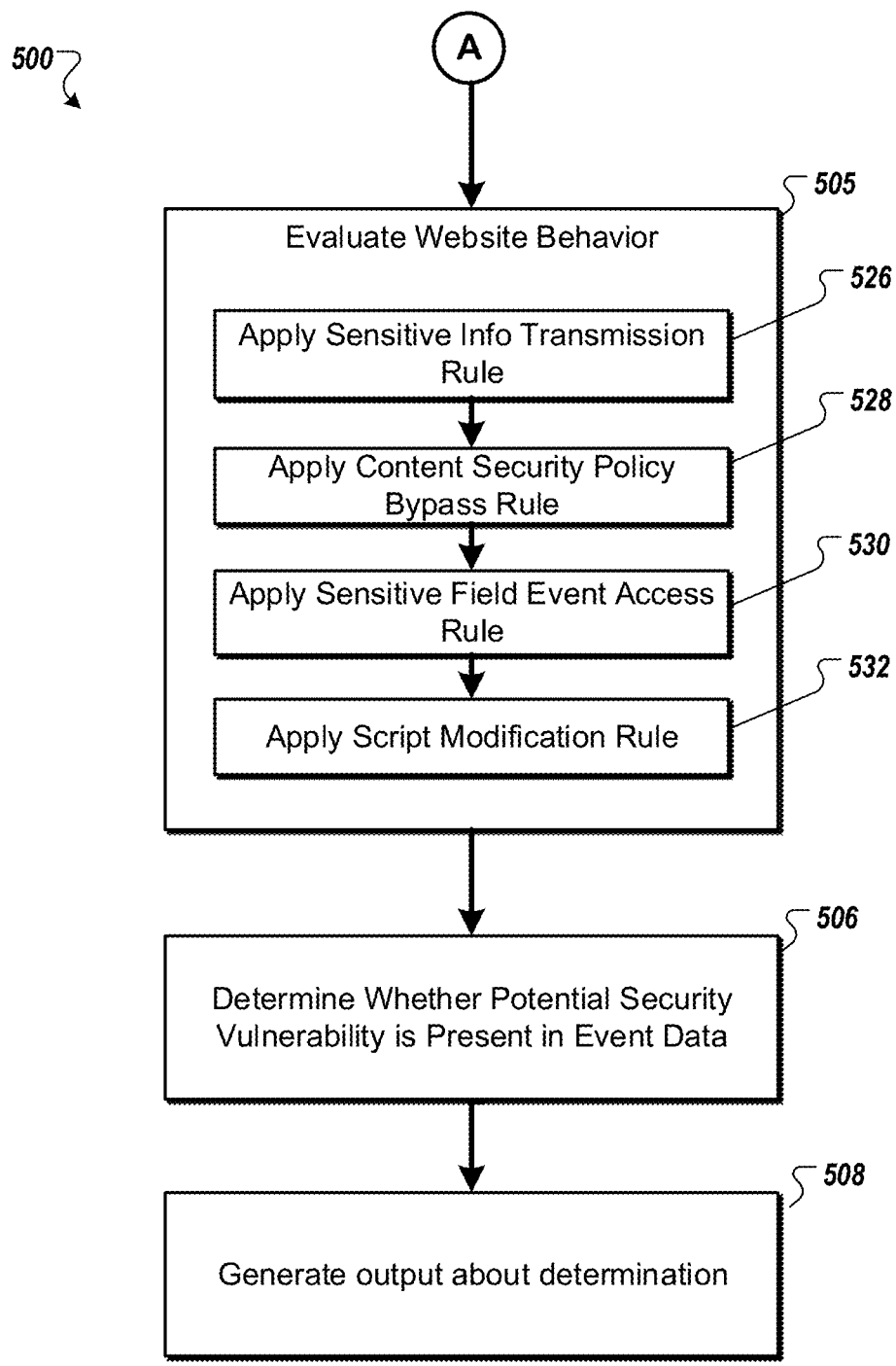

The computer system can then determine whether one or more indicators are present (410). The indicators can be identified based on application of the rules to the event data. The indicators may indicate whether a potential security vulnerability exists. Each of the rules can output different indicators. Moreover, each indicator can relate to a different type of security vulnerability. Refer to FIGS. 5A-B for further discussion about the types of indicators that can be generated per rule.

If indicators are not present, the computer system can return a notification validating the website code for the particular event data (412). In other words, the computer system can determine that the particular event data does not have any potential security vulnerabilities and that the website code is secure. In some implementations, if there are no indicators present, the computer system may simply return to 404 and repeat blocks 404-414 for other event data. Thus, the computer system may not generate, return, or otherwise output any notifications, messages, or alerts unless a potential security vulnerability is detected. As soon as an indicator, however, is present in some event data, the computer system can determine that the website code is not secure (even if no indicators are present in other event data associated with the website). Thus, since the process 400 can be performed in real-time and during runtime, it can be possible to identify the website code as secure one moment as the website code relates to first event data but then to determine that the website code is no longer secure the next moment when a potential security vulnerability is identified in second event data.

Once the computer system returns the notification in 412, the computer system can return to 404 and receive other event data from website code being testing. The computer system can repeat blocks 404-414 until the website testing is complete. In some implementations, as described herein, the computer system can receive event data simultaneously and can perform the process 400 in parallel for each of the received event data.

Returning to 410, if one or more indicators are present, the computer system can return an alert of a potential security vulnerability in 414. The alert can be associated with the particular event data that was tested against the rules in the process 400. The alert can, in some implementations, be or include a report that can be reviewed by a security analyst. The report can include information indicating what rules were tested against the event data, what type of event was identified, and/or what rule(s) was triggered when tested against the event data. Other information can also be included in the alert and/or report that can be useful to the security analyst to diagnose and address the potential security vulnerability.

Once the computer system returns the alert in 414, the computer system can return to 404 and receive event data from website code being testing. The computer system can repeat blocks 404-414 until the website testing is complete. In some implementations, as described herein, the computer system can receive event data simultaneously and can perform the process 400 in parallel for each of the received event data.

FIGS. 5A-B is a flowchart of a process 500 for identifying presence of a potentially-malicious script in event data in a website. In other words, the process 500 can provide for identifying potential security vulnerabilities in the website based on application of one or more rules to event data that is received from the website as it is tested. The process 500 can also be performed as part of block 408 in the process 400 (e.g., refer to FIG. 4), in which the computer system applies one or more rules to the event data. As described in reference to the process 400 in FIG. 4, curated sets of rules can be applied to each event data to provide for fast and efficient analysis and detection of potential security vulnerabilities while the website is tested. Therefore, in some implementations, only a portion of the rules described in the process 500 may be applied to particular event data. Moreover, different portions or sets of the rules described in the process 500 may be applied to different event data, for example, based on a type of each event data.

The process 500 can be performed during runtime and can be client-side. In other words, the process 500 can be performed by a client device, such as the test client device 104 depicted and described in FIG. 1. The process 500, and/or blocks in the process 500, can also be performed by another computer system, cloud-based service, and/or network of computers and/or devices, such as the website security testing system 102 in FIG. 1. For illustrative purposes, the process 500 is described from the perspective of a computer system.

Referring to both FIGS. 5A-B, the process 500 can include evaluating event data in website code (502), evaluating source/destination information (504), evaluating website behavior (505), determining whether potential security vulnerabilities are present in the event data (506) and generating output (508).

Evaluating event data in the website code (502) can be performed by monitoring event data as it is generated by testing the website. Evaluating the event data (502) can include applying one or more rules against the event data to identify any indicators (e.g., strings, code snippets, etc.) that may represent abnormal, suspicious, or malicious actors (e.g., scripts, domains, etc.). In some implementations, evaluating the event data (502) can also include applying one or more rules against the website code itself. As an illustrative example, the website code can be evaluated to determine whether the website code includes one or more known malicious code snippets, which have been typically shown in known malicious code and designed to hide their behavior, such as heavy obfuscation or malicious code that have been known by digital schemers.

In some implementations, evaluating the event data (502) can include applying an encryption rule against the event data and/or the website code (510). For example, the encryption rule includes a rule that looks for presence of particular encryption libraries. The encryption rule can be configured to identify indicators for presence of script-based encryption libraries in the event data and/or the website code. Thus, the computer system can search for a clue of encryption with script-based encryption libraries, instead of the actual payloads. The encryption rule can include a list of strings (e.g., code snippets) that are indicative of presence of encryption. The computer system can determine whether the website code includes one or more strings that match encryption indicators listed in the encryption rule. Some schemers encrypt their payloads with encryption libraries (e.g., JavaScript encryption libraries), while the website being targeted does not typically need to use such encryption libraries because it has already encrypted all traffic in and through the website. Because a website typically has all the code and traffic encrypted and does not use such encryption libraries, presence of script-based encryption libraries may be a strong indicator of presence of malicious script in the website. In some implementations, the encryption rule can be applied against static code of the website. The indicator of encryption identified by the computer system can be aggregated with other indicators described herein, and the aggregate of indicators can be provided to the security analysts via the computing devices or systems described herein, so that the security analysts can perform further investigation.

In addition or alternatively, evaluating the event data (502) can include applying an obfuscation rule against the event data and/or the website code (512). The obfuscation rule can be configured to identify indicators for presence of obfuscation and/or obfuscation type in the event data and/or website code. The indicators can be of various types of strings or code snippets, such as words, phrases, symbols, operators, characters, function calls, etc. The indicators can represent a pattern of strings or code snippets that occur in obfuscated code in general, or in a particular type of obfuscation. Because a website typically has no or little obfuscation code needed, presence of obfuscation may be a strong indicator of presence of malicious code in the website. The obfuscation rule can include a list of strings (e.g., code snippets) that are indicative of presence of obfuscation and/or obfuscation type. Some schemers obfuscate their malicious scripts, while the website being targeted typically include no or little obfuscation code. Different types of obfuscation tools convert such malicious code into obfuscated code with particular patterns of strings (e.g., unique variable names, functions, characters, etc.). By way of example, one example obfuscation tool generates abnormal functions calls, a series of particular characters (e.g., "0" and "w"), or an atypical pattern of strings, such as "[four hexadecimal strings].[3 hexadecimal strings]=[function], "<<<>>," "===[function]," etc. The obfuscation rule can be generated and applied with respect to each of different obfuscation types. Alternatively, the obfuscation rule can be generated and applied with respect to obfuscation in general.

The computer system can determine whether the event data and/or the website code includes one or more strings that match the obfuscation indicators listed in the obfuscation rule. If no such strings are present, the computer system can return an indicator that represents no obfuscation or no malicious obfuscation. Alternatively, no indicator, signal, or the like may be returned if there is no such string present. If one or more strings in the event data and/or the website code match any of the obfuscation indicators in the obfuscation rule, the computer system can return an indicator of obfuscation. The indicator of obfuscation can represent presence of obfuscation in the event data. In addition, the indicator of obfuscation can represent a type of obfuscation being used. The indicator of obfuscation can be provided in various forms, such as an alert, notification, message, etc., and can be transmitted to one or more security analysts via their computing devices that may be part of the website security testing system 102 (e.g., refer to FIG. 1). The indicator of obfuscation can be aggregated with other indicators described herein, and the aggregate of indicators can be provided to the security analysts via the computing devices or systems, so that the security analysts can perform further investigation.

In addition or alternatively, evaluating the event data (502) can include applying a mask rule against the event data and/or the website code (514). The mask rule can be configured to identify indicators of presence of masks on form fields or other elements that originate from outside the website. The indicators can be of various types of strings or code snippets, such as words, phrases, symbols, operators, characters, function calls, etc. The indicators can represent a pattern of strings or code snippets that occur in masks on fields or other elements. The mask rule can include a list of strings (e.g., code snippets), patterns, and/or other code features that are indicative of presence of masks and/or other code that attempts to bind itself to fields or other elements in the website. Masks can be implemented, for example, by scripts that attempt to access user input provided to website fields and perform operations on the user input, such as modifying it to a standardized format. However, masks and/or other scripts attempting to bind to input fields and other elements in a website can be used by malicious actors to access user input and other sensitive information on a website. One example of a mask script that has been used by malicious actors is a script named "j Query Mask." The mask rule can be used to identify the presence of scripts that can be used to maliciously use masking techniques. Determinations and outputs made by applying the mask rule to the event data and/or the website code can be similar as the determinations and outputs described with regards to applying the encryption rule (510) and the obfuscation rule (512).

In addition or alternatively, evaluating the event data (502) can include applying a sensitive information request rule to the event data and/or the website code (516). The sensitive information request rule can be configured to determine whether an outgoing request exists in the event data and/or the website code that attempts to transmit sensitive information to a domain that is outside the website or a domain that is suspicious. The sensitive information can include login credentials (e.g., username, password, etc.), email addresses, biometric elements, elements for multifactor authentication, and other sensitive information. Determinations and outputs made by applying the sensitive information request rule to the event data and/or the website code can be similar as the determinations and outputs described with regards to applying the encryption rule (510) and the obfuscation rule (512).

Figure 6:
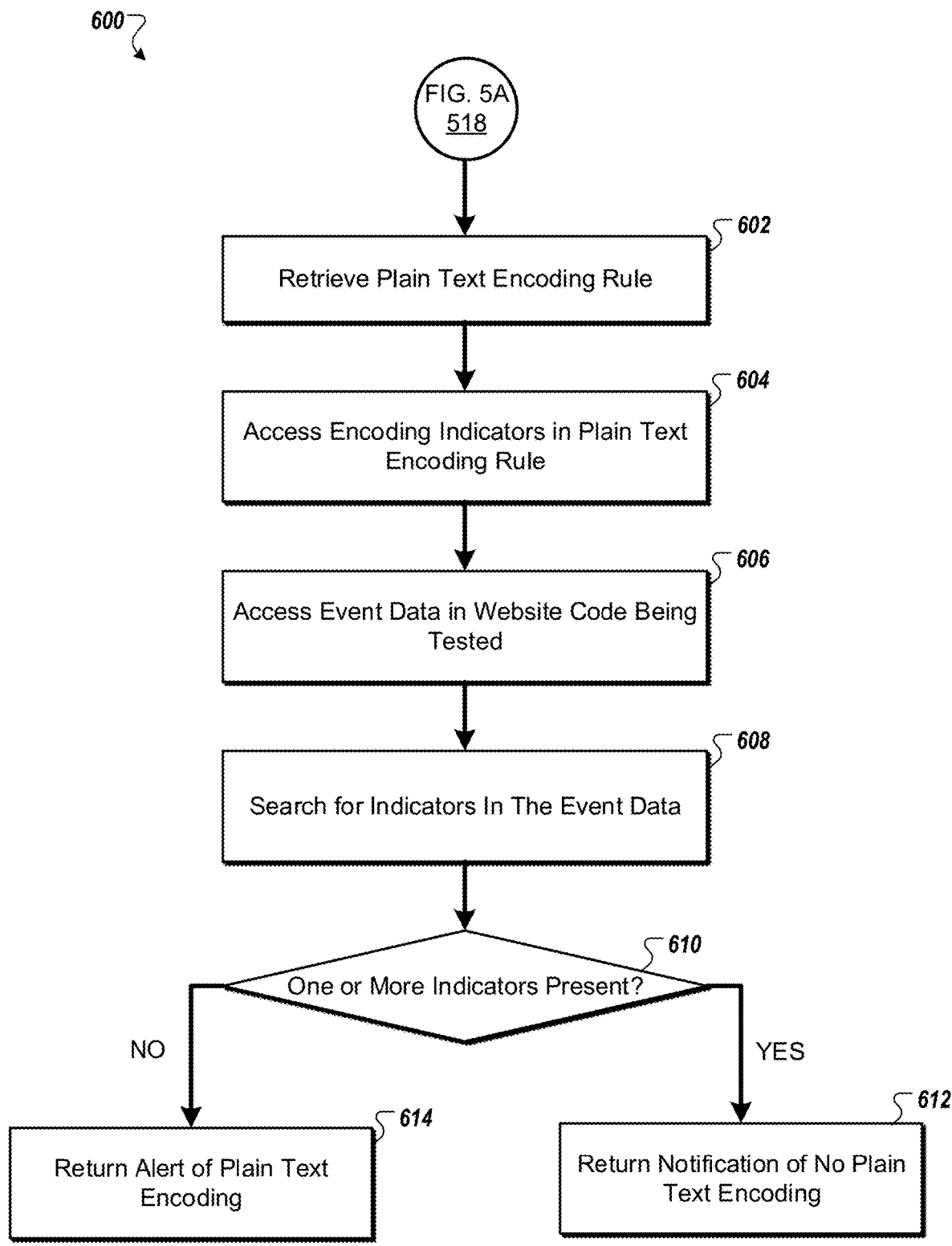
FIG. 6 is a flowchart of a process for evaluating event data in website code based on a plain text encoding rule.
Figure 7:
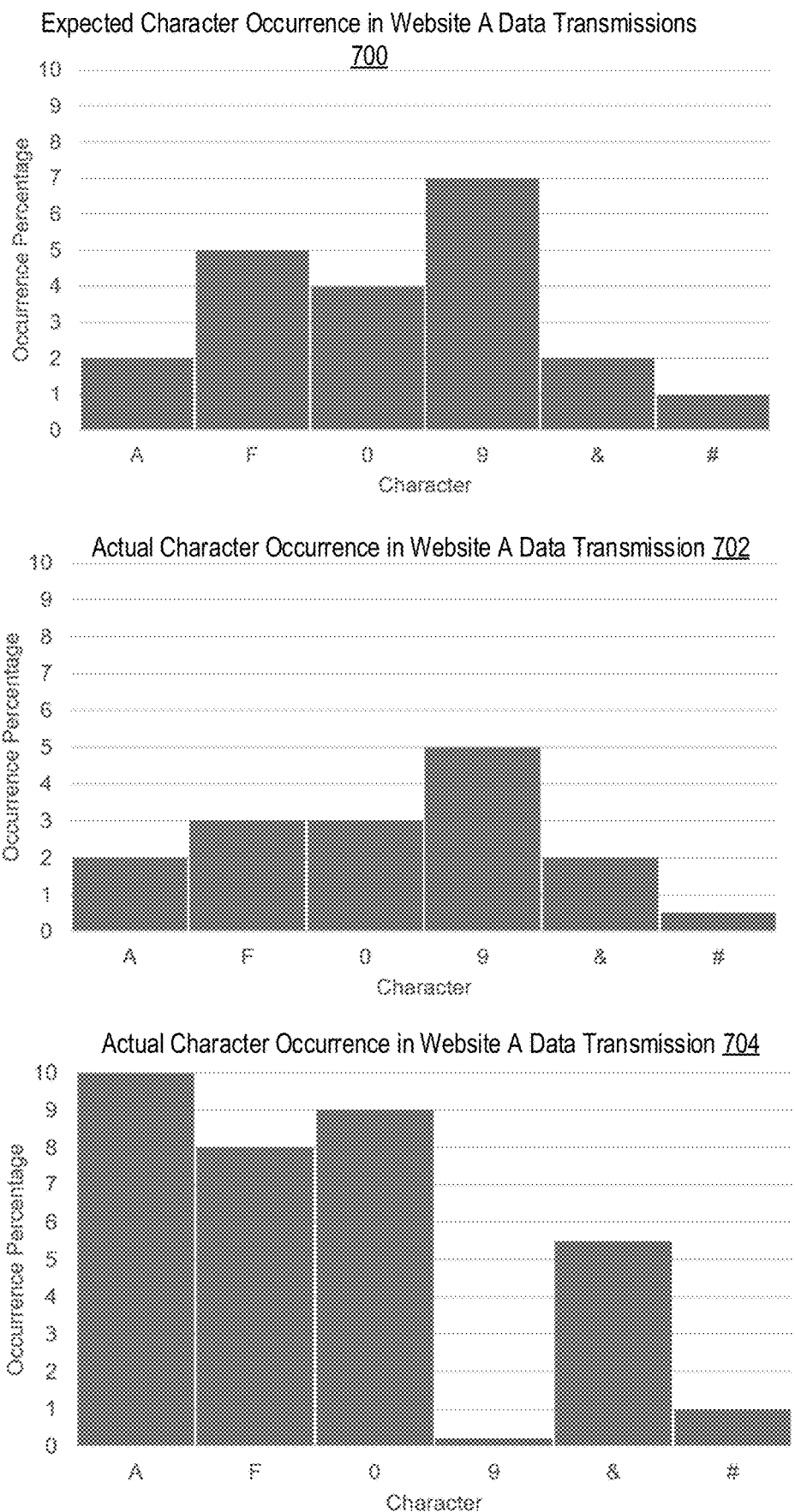
FIG. 7 illustrates example statistical analysis of data transmissions in event data of a website using the process of FIG. 6.

In addition or alternatively, evaluating the event data (502) can include applying a plain text encoding rule to the event data and/or the website code (518). The plain text encoding rule can be configured to determine whether strings of characters and/or characters in data transmissions (e.g., outbound network traffic) have been modified as a form of data exfiltration. Thus, the plain text encoding rule can identify indicators of presence of suspicious data encoding. Refer to FIGS. 6-7 for further discussion.

Evaluating the source/destination information (504) can be performed by monitoring network traffic going out and coming into the website. Evaluating the source/destination information (504) can include applying one or more rules against a dynamic behavior data included in the event data, which can record website behavior (e.g., the event data 134, 240 herein) to identify any abnormal, suspicious, or malicious network traffic.

In some implementations, evaluating the source/destination information (504) can include applying a known bad actors rule against the event data (520). The known bad actors rule can be configured to search for known bad actors identified in the event data. The known bad actors can include domains (e.g., URLs) that are observed to have been used for malicious activities, or domains that are likely used for particular malicious activities (or used by particular schemers). The computer system can search for actors in the event data (e.g. both inbound and outbound network traffic) that matches known bad actors in a list. Determinations and outputs made by applying the known bad actors rule to the event data and/or the website code can be similar as the determinations and outputs described with regards to applying the encryption rule (510) and the obfuscation rule (512).

In addition or alternatively, evaluating the source/destination information (504) can include applying an unknown actors rule against the event data (522). The unknown actors rule can be configured to search for unknown actors identified in the event data (e.g., both inbound and outbound network traffic). The unknown actors can include domains (e.g., URLs) that have never been observed or known in general or by a particular group of security analysts or other users. Such unknown actors may be associated with either malicious or benign activities. For example, the unknown actors can be actors that are not included in the list of known actors that have been tracked and identified by security analysts or other users using one or more domain tools. The computer system can search for one or more unknown actors by searching for actors in the event data that are not found in the list of known actors. Determinations and outputs made by applying the unknown actors rule to the event data and/or the website code can be similar as the determinations and outputs described with regards to applying the encryption rule (510) and the obfuscation rule (512). In some implementations, once an unknown actor (e.g., domain) has been identified, the unknown actor can be categorized into a known actor and included in the list of known actors. The known actors that were carried over from unknown actors can be maintained in the list so that the list of known actors keeps growing. Alternatively, the known actors that were categorized from the unknown actors can be periodically purged.

Figure 8:
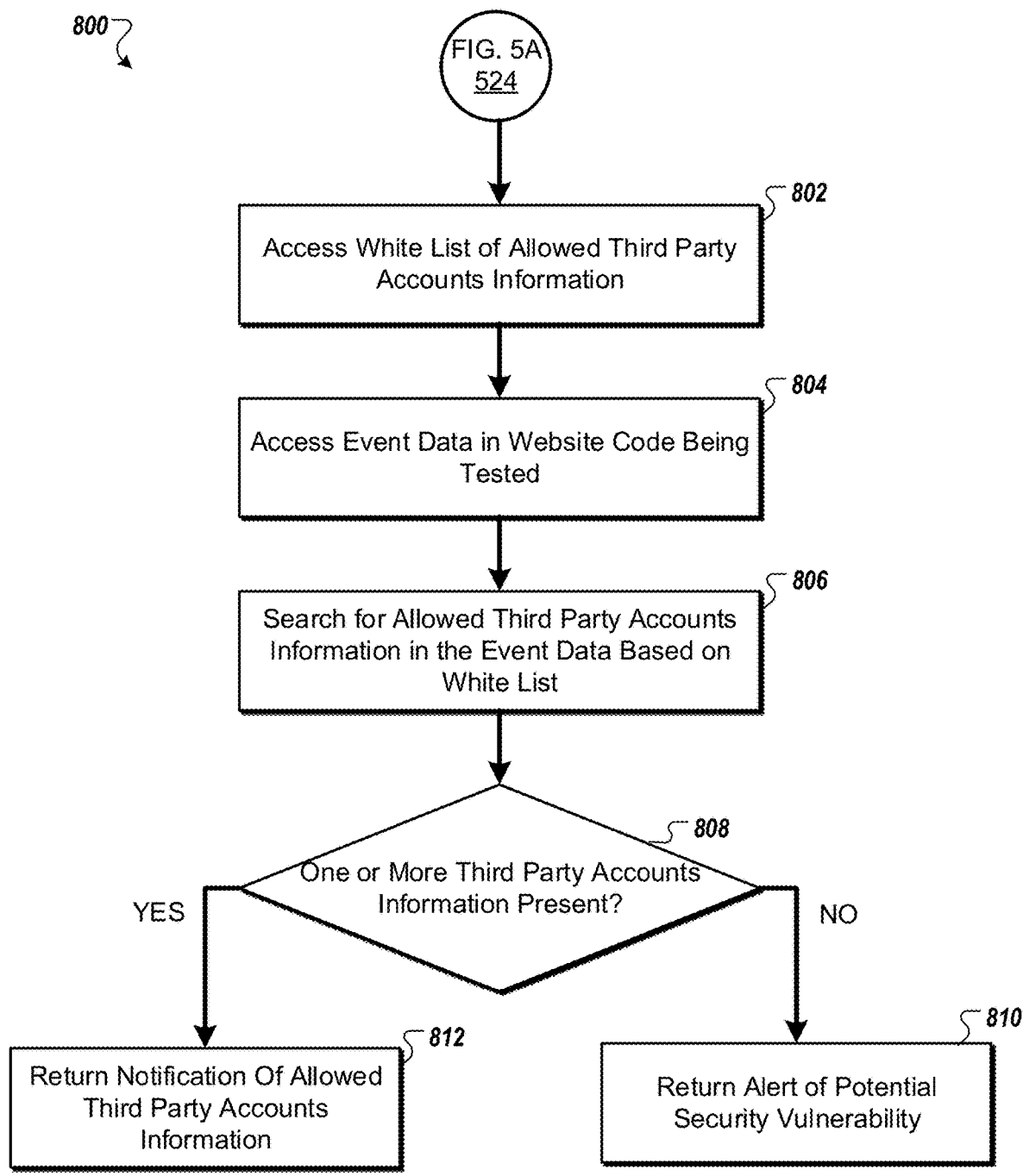
FIG. 8 is a flowchart of a process for evaluating event data in website code based on a whitelist of allowed third party accounts information.
Figure 9:
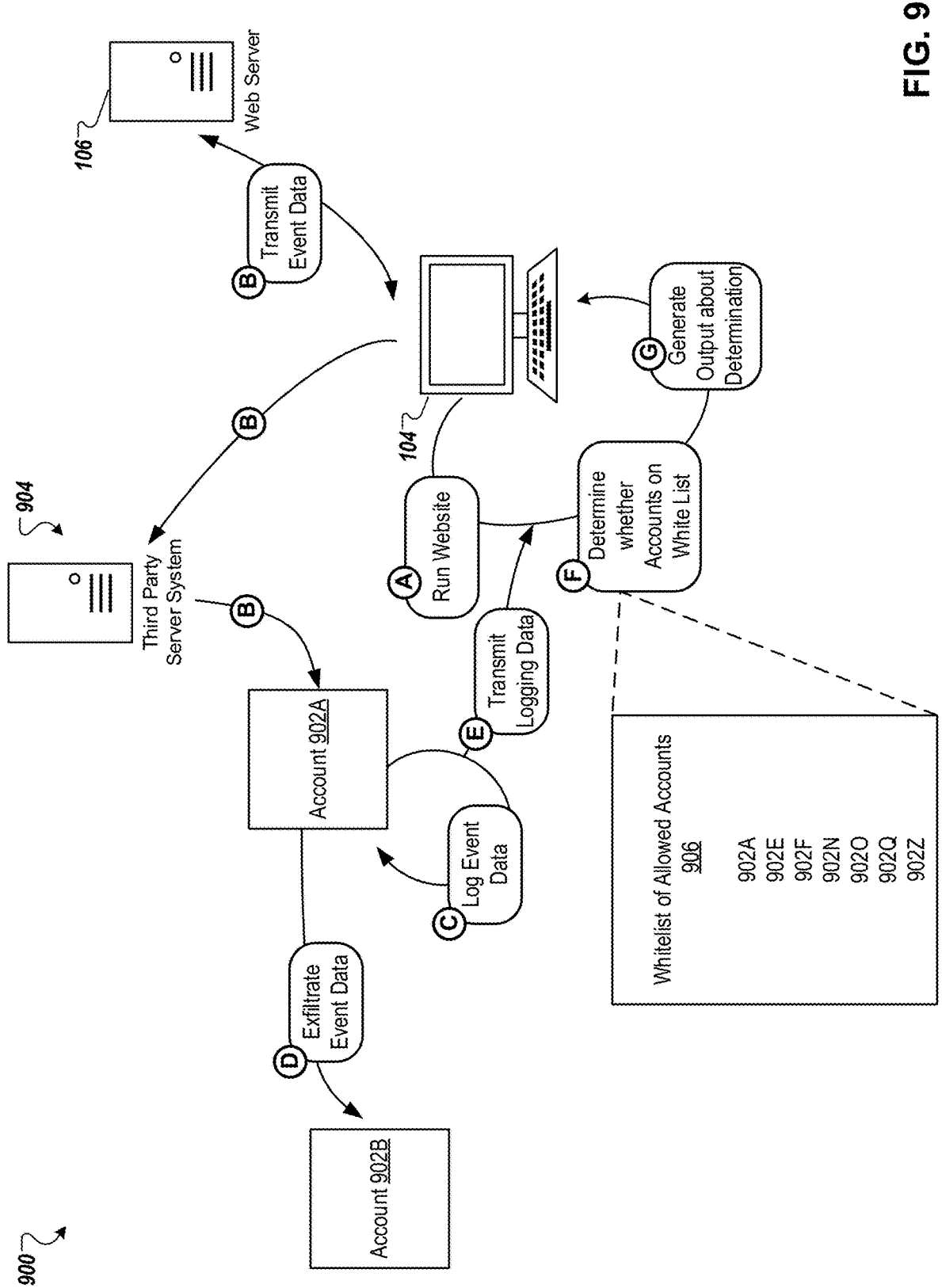
FIG. 9 illustrates an example computing environment in which the process of FIG. 8 can be implemented to detect a security vulnerability in event data of a website.

In addition or alternatively, evaluating the source/destination information (504) can include applying an exfiltration by third party account rule against the event data (524). The exfiltration by third party account rule can be configured to match actors identified in the event data with allowed actors in a whitelist. The allowed actors can be identified by one or more information, such as domains, user account names, email addresses, IP addresses, etc. Refer to FIGS. 8-9 for further discussion.

Evaluating website behavior (505) can be performed by monitoring website behavior during runtime on an event basis. Evaluating website behavior (505) can include applying one or more rules against dynamic event data that records the website behavior (e.g., the event data 134, 240 herein) to identify any abnormal, suspicious, or malicious behavior of the website.

In some implementations, evaluating website behavior (505) can include applying a sensitive information transmission rule against the event data (526). The sensitive information transmission rule can be designed to monitor outgoing network traffic and determine if there are requests in the outgoing network traffic that contain sensitive information and are transmitted to a domain that is not the website or otherwise suspicious. In some implementations, the sensitive information transmission rule can include a whitelist that categorizes domains to which sensitive information may be safely transmitted. If an outgoing request with sensitive information is transmitted to a domain included in the whitelist, the request is not determined to be malicious. If the outgoing request with sensitive information is transmitted to a domain that is not included in the whitelist, the request can be determined to be malicious and an alert can be generated. Determinations and outputs made by applying the sensitive information transmission rule to the event data and/or the website code can be similar as the determinations and outputs described with regards to applying the encryption rule (510) and the obfuscation rule (512).

In addition or alternatively, evaluating website behavior (505) can include applying a content security policy bypass rule against the event data (528). The content security policy bypass rule can be designed to detect an activity or attempt to bypass a security policy executed in a browser and connect to a malicious server in network traffic (e.g., outbound network traffic). The content security policy bypass rule can also be used to identify content security policy bypass patterns. The patterns can include bypass activities or attempts observed to have been used by schemers to bypass security policies. In addition or alternatively, the bypass patterns can include bypass activities or attempts that are likely used for particular bypass activities to access malicious servers. The patterns can be identified as functions that have been called or to be called within bypass arguments in event data and/or dynamic behavior logs of the website being tested. In addition or alternatively, the patterns can be identified as strings in files. The patterns can be tracked and identified by security analysts or other users using tools. In some implementations, the computer system can detect functions that have been called or to be called within bypass arguments in the event data. In addition, the computer system can detect such bypass requests that have been transmitted, or attempted to be transmitted, to/from domains outside whitelisted domains. Determinations and outputs made by applying the content security policy bypass rule to the event data and/or the website code can be similar as the determinations and outputs described with regards to applying the encryption rule (510) and the obfuscation rule (512).

In addition or alternatively, evaluating website behavior (505) can include applying a sensitive field event access rule against the event data (530). The sensitive field event access rule can be designed to detect any code that binds to an event (e.g., a checkout button) for fields configured to receive user inputs of sensitive information (e.g., credit card number, expiration, card validation digit (CVD), card pin, card name, address, zip code, etc.). The sensitive information for testing the website behavior can include login credentials submitted to login fields, payment data (e.g., credit card information) submitted to checkout fields or to user profile fields, and other information submitted to sensitive element fields in the website. The computer system can detect any code that binds to an event (e.g., a checkout button) for fields configured to receive user inputs of sensitive information (e.g., credit card information). For example, digital schemers can steal credit card information or other sensitive information when a user inputs such information and clicks on a checkout button in a checkout page. The computer system can therefore determine whether there is code running in the webpage or associated with particular event data and binding to the user's clicking on the checkout button that has not been observed or known before. As such, the computer system can monitor a third-party script that modifies the behavior of the website by adding a dumb click button event and intercepting the user input from the sensitive information fields as the user enters such information in the fields and clicks on the button.

The computer system can determine whether there are multiple bindings to events for sensitive information fields. The computer system can identify the number of binding events for each sensitive information field in each event data analysis. If the number of such event binding events exceeds a threshold value, the website can be considered to include a malicious script or other potential security vulnerabilities and may be further investigated. In addition or alternatively, if the number of the binding events for each field varies across different tests for the website (e.g., different events), the website can be investigated to identify what (e.g., domains, scripts, etc.) caused the binding events. In addition or alternatively, if the binding events are identified from various scripts that have not been known, the domains (e.g. URLs) that caused the binding events can be tracked. Determinations and outputs made by applying the sensitive field event access rule to the event data and/or the website code can be similar as the determinations and outputs described with regards to applying the encryption rule (510) and the obfuscation rule (512).

In addition or alternatively, evaluating website behavior (505) can include applying a script modification rule against the event data (532). The script modification rule can be designed to monitor indicators of script behavior modification in a website when the website is being observed. Determinations and outputs made by applying the script modification rule to the event data and/or the website code can be similar as the determinations and outputs described with regards to applying the encryption rule (510) and the obfuscation rule (512).

Referring still to FIGS. 5A-B, and as described throughout this disclosure, when the event data, the website code, the source/destination information, and/or the website behavior are evaluated, the process 500 can include determining whether a potential security vulnerability is present in the event data (506).

As described herein, the computer system can generate output about the determination made in 506 (508). For example, the computer system can generate an alert (e.g., message) for each of the rules being applied and/or for each of the event data that is tested/analyzed. For example, each of the rules described herein can be applied against each event data, static website code, and/or dynamic behavior logs, and if the computer system determines that the evaluation based on that rule turns out to be positive, the computer system can generate (e.g., return) an alert (e.g., message) of presence of a potential security vulnerability (e.g., malicious script) in the website. Such an alert can be generated with respect to each of the rules being applied. In addition, for each rule being applied, one or more alerts can be generated depending on the number of positive instances identified based on the rule being applied. In some implementations, the alerts can be aggregated after all or some of the rules that are available have been applied. The number of alerts can be correlated with the likelihood of a malicious script or other security vulnerability being present in the particular event data of the website. In general, an increasing number of alerts being generated can indicate a more likelihood that a security vulnerability is present in the website, and further security investigation (by security analysts or by automated systems) may be warranted.

FIG. 6 is a flowchart of a process 600 for evaluating event data in website code based on a plain text encoding rule. The process 600 can be performed to determine whether data transmissions (e.g., outbound network traffic) in event data includes atypical data encoding. Malicious users can attempt to encode sensitive data in plain text in ways that are intended to appear innocuous. For example, malicious users can encode sensitive data in a series of tabs and white spaces, with the tabs representing 0 and the white spaces representing 1 in binary code. At first glance, a string of such tabs and white spaces may not appear suspicious but may in fact be encoding the values for sensitive information. The process 600 can therefore apply textual analysis rules that identify anomalous characters, concentrations/sequences of characters in data transmissions. Using the process 600, a computer system can therefore determine when a series of tabs and white spaces may exceed a proportion of such characters that is typically expected to be transmitted by a client device, and therefore trigger an alert of a potential security vulnerability.

As an example, the process 600 can include statistical analysis to analyze statistical spreads over time of strings and patterns of characters used in the data transmissions. If one or more strings and/or patterns of characters in a particular data transmission deviates by a predetermined threshold amount from the statistical spreads, then a potential security vulnerability can be identified. Moreover, the process 600 can be performed as part of block 518 in the process 500 (e.g., refer to FIG. 5A) in which a computer system evaluates event data in website code by applying the plain text encoding rule to the event data.

The process 600 can be performed during runtime and can be client-side. In other words, the process 600 can be performed by a client device, such as the test client device 104 depicted and described in FIG. 1. The process 600, and/or blocks in the process 600, can also be performed by another computer system, cloud-based service, and/or network of computers and/or devices, such as the website security testing system 102 in FIG. 1. For illustrative purposes, the process 600 is described from the perspective of a computer system.

Referring to the process 600, the computer system can retrieve the plain text encoding rule in 602. For example, the rule can be accessed in local cache/memory of the computer system. The rule can also be retrieved from a data store, as described herein.

The computer system can access encoding indicators in the plain text encoding rule (604). The indicators can include statistical spreads of known or expected characters and/or strings of characters for data transmissions/network traffic from the particular website. The statistical spreads can be generated for a past 7 minutes of network traffic that is detected for the particular website and/or based on particular event data. The statistical spreads can be generated for one or more other predetermined periods of time, including but not limited to a past 1 minute, 2 minutes, 5 minutes, 10 minutes, hour, etc.).

The computer system can therefore compare the statistical spreads to present data transmissions in the event data in order to tease out potential data exfiltration and encoding by malicious third parties. Malicious third parties may code sequences of tabs and white spaces in binary that can then be converted to hex values or other encoding, thereby posing a potential security threat. By comparing characters and patterns of such patterns in runtime data transmissions against recent statistical spreads for similar network traffic at the website, the computer system can identify, in real-time, potential security vulnerabilities.

As an illustrative example, the website can be an online retail store and the event can be completion of a purchase transaction. The computer system can retrieve statistical spreads for characters and patterns of characters that are used in transmitting payment information for the online retail store during a past 7 minutes. The computer system can compare characters and patterns of characters in a current purchase transaction completion event to the statistical spreads. If the current purchase transaction completion event data deviates from the statistical spreads by some predetermined threshold amount (e.g., 95% of similar events included the letter "A" in a particular pattern but the current event does not include the letter "A" at all and instead includes white spaces where the letter "A" would have appeared), the computer system may identify that the current event is encoded by a malicious party and therefore presents a potential security vulnerability.

Still referring to the process 600, the computer system can also access event data in the website code being tested in 606. The block 606 can be performed before, during or after blocks 602 and/or 604. For example, in some implementations, before the computer system can access indicators such as the statistical spreads in 604, the computer system may receive the event data in the website code. The computer system can then determine what indicators to access based on the type of event that is identified by the event data. As an illustrative example, the computer system can receive a purchase transaction completion event. The computer system can identify this event as a purchase transaction completion and therefore determine that it should access statistical spreads of characters and patterns of characters for events having the same type: purchase transaction completion. In some implementations, on the other hand, the computer system may receive information about the type of event and/or the website before the computer system accesses the event data in the website code.

In 608, the computer system can search for one or more indicators in the event data. As described above and further in reference to FIG. 7, the computer system can search the event data to determine whether one or more expected characters or pattern(s) of character(s) appear in the data transmissions for that event data. As mentioned above, the computer system can compare the event data to statistical spreads of characters or patterns of characters over the predetermined period of time. The predetermined period of time can be short enough such that the statistical spreads are frequently updated to reflect data transmission trends during runtime. As a result, the computer system can determine, in real-time, whether any data transmission is deviating from other data transmissions at or around a same time and therefore indicative of malicious coding. This can provide for quick and accurate identification of potential security vulnerabilities during runtime so that such vulnerabilities and be immediately addressed and/or resolved.

The computer system can determine whether one or more indicators are present in 610. In other words, the computer system can compare the data transmission(s) in the event data to the statistical spreads. If the characters and/or patterns of characters in the data transmission(s) are the same or similar (e.g., within a predetermined threshold range) to the statistical spreads, then the computer system can determine that the event data does not have malicious encoding and therefore does not pose a potential security vulnerability. Thus, if one or more indicators are present (e.g., the data transmissions are the same or similar to the statistical spreads), the computer system can return a notification of no plain text encoding (612). In some implementations, the process 600 can end and the computer system may not return any value, indication, message, or notification in 612.

On the other hand, if one or more indicators are not present, the computer system can return an alert for plain text encoding (614). In other words, the computer system can determine that the characters and/or patterns of characters in the data transmission(s) are not the same or similar (e.g., they exceed the statistical spreads by a predetermined threshold amount/level/value) to the statistical spreads. Instead, the data transmission(s) deviate substantially from the statistical spreads, which can be an indicator of malicious encoding and a potential security vulnerability. The alert can be transmitted to and outputted by a user device for presentation to a security analyst or other relevant stakeholder. Upon receiving such an alert, the security analyst or other relevant stakeholder can immediately address the identified potential security vulnerability.

FIG. 7 illustrates example statistical analysis of data transmissions in event data of a website using the process of FIG. 6. FIG. 7 depicts an expected character occurrence in website A data transmissions histogram 700, actual character occurrence in a website A data transmission histogram 702, and actual character occurrence in a website A data transmission histogram 704. The histogram 700 can depict the occurrence of particular characters in data transmissions from the website A over a predetermined period of time, such as the last 7 minutes. The histograms 702 and 704 depict example actual character occurrences as detected in data transmissions from the website A. The histograms 702 and 704 can represent the character occurrences at one or more times during runtime. For example, the histogram 702 can depict the actual occurrence of characters in a particular data transmission from the website A at a current/present time. The histogram 704 can depict the actual occurrence of characters in the same data transmission from the website A at another time, such as 1 minute, 2 minutes, 5 minutes, 7 minutes, 10 minutes, etc. after the time of the histogram 702. The histograms 702 and 704 can represent the character occurrences at one or more other times.

Although the process 600 in FIG. 6 is described in reference to identifying abnormalities in use of white spaces and tabs in binary code, the disclosed techniques can also be used to identify abnormalities in other characters that may appear in data transmissions (e.g., hex), as shown in FIG. 7. Using the disclosed techniques, the computer system can look at frequency of different characters and sequences of such characters to see how they appear in the data transmissions received during runtime. The computer system can compare the frequency and sequences to statistical spreads of the same characters to identify anomalies in the runtime data transmissions. Thus, the computer system can look for anomalous outgoing traffic from the website to detect potential security vulnerabilities in real-time.

In the histograms 700, 702, and 704, the x-axis represents characters and the y-axis represents occurrence percentages for each of those characters. In some implementations, the x-axis can represent particular patterns of characters instead of or in addition to individual characters. In some implementations, the y-axis can represent frequency percentages for each of the characters and/or patterns of characters.

The histogram 700 can present average occurrence percentages for each of the identified characters in data transmissions from the website during the predetermined period of time. For example, the characters A, F, 0, 9, &, and #appear in data transmissions from the website during the predetermined period of time (e.g., a last 7 minutes). These characters can be identified from all of the data transmissions during the predetermined period of time. These characters can also be identified from a portion of all the data transmissions that occur during the predetermined period of time. One or more additional or fewer characters may also appear in the data transmissions and be reported in the histogram 700. The computer system can then determine how frequently each of those characters appear in the data transmissions during the predetermined period of time. For example, on average for each data transmission from the website during the predetermined period of time, the character A appears 0-2% of the time, F appears 0-5% of the time, 0 appears 0-4% of the time, 9 appears 0-7% of the time, & appears 0-2% of the time, and #appears 0-1% of the time.

The histogram 702 depicts character occurrences in an actual data transmission that is received at a current time or otherwise in real-time/during runtime. As shown here, the computer system can determine that the character A appears 2% of the time, F appears 3% of the time, 0 appears 3% of the time, 9 appears 5% of the time, & appears 2% of the time, and #appears 0.5% of the time in the actual data transmission. The computer system can compare the histogram 702 to the histogram 700 to detect anomalies. An anomaly can be detected when a character deviates from the expected character occurrence percentage in the histogram 700 by a predetermined threshold amount. In the example of histogram 702, each of the characters A, F, 0, 9, &, and #are within the expected occurrence percentages of the histogram 700. Therefore, no anomalies are detected by the computer system. The computer system can determine that the actual data transmission does not have encoding and therefore does not pose a potential security threat at the present time.

The histogram 704 depicts character occurrences in an actual data transmission that is received at a current time or otherwise in real-time/during runtime. As shown here, the computer system can determine that the character A appears 10% of the time, F appears 8% of the time, 0 appears 9% of the time, 9 appears 0.25% of the time, & appears 5.5% of the time, and #appears 1% of the time in the actual data transmission. The computer system can compare the histogram 704 to the histogram 700 to detect anomalies. An anomaly can be detected when a character deviates from the expected character occurrence percentage in the histogram 700 by a predetermined threshold amount. In the example of histogram 704, each of the characters A, F, 0, 9, and & deviate considerably from the expected occurrence percentages of the histogram 700. The characters A, F, 0, 9, and & can deviate from their respective expected occurrence percentages by more than the predetermined threshold amount. Therefore, anomalies are detected by the computer system. The only character that appears within the expected occurrence percentages of the histogram 700 is #. The computer system can determine that the actual data transmission has encoding and therefore poses a potential security threat at the present time.

FIG. 8 is a flowchart of a process 800 for evaluating event data in website code based on a whitelist of allowed third party accounts information. The process 800 can be performed to determine whether information is being transmitted between unauthorized third party accounts that are authorized by website owners to receive data related to user access of the websites. Malicious users can exfiltrate data to third party systems. Malicious users can potentially corrupt third party account information to divert tracked data to the malicious users' accounts rather than intended third party accounts. Thus, the tracked data may be modified to include sensitive, personal, or otherwise private information, such as usernames, passwords, and credit card information. Activity on third party systems can be logged to particular user accounts. The process 800 can be used to identify where third party data is going (e.g., what third party account(s)), whether the destination of the third party data is approved, and, consequently, whether a malicious user has potentially tampered with the data transmission.

The process 800 can similarly be used to analyze third party data that is leaving one third party account and going to another third party account. By analyzing the third party data itself, a computer system can determine whether a third party account has been breached. The computer system can analyze the third party data by identifying a quantity (e.g., size) of the third party data being transmitted to the other third party account and determining whether the quantity of the third party data exceeds some expected quantity associated with the particular type of data transmission (e.g., typically, 10 kb of data can be transmitted between the two accounts, but this time, 5 mb of data is transmitted between the accounts).

As described herein, the process 800 can include monitoring data transmissions between third party accounts to determine whether the third party accounts appear in a whitelist of allowed third party accounts information. If the third party accounts appear or match values in the whitelist, then the particular event data can be validated and the website may be secure. If, on the other hand, the third party account does not match values in the whitelist, then the particular event data can pose a potential security vulnerability and can be flagged as such.

The process 800 can be performed as part of block 524 in the process 500 (e.g., refer to FIG. 5A) in which a computer system evaluates event data in website code by applying the exfiltration by third party account rule. The process 800 can be performed during runtime and can be client-side. In other words, the process 800 can be performed by a client device, such as the test client device 104 depicted and described in FIG. 1. The process 800, and/or blocks in the process 800, can also be performed by another computer system, cloud-based service, and/or network of computers and/or devices, such as the website security testing system 102 in FIG. 1. For illustrative purposes, the process 800 is described from the perspective of a computer system.

Referring to the process 800, the computer system can access a whitelist of allowed third party accounts information (802). Each website can have a respective whitelist. In some implementations, each event associated with the website can have a respective whitelist. The whitelist can also be associated with particular third party services, websites, and/or systems. The accessed whitelist can contain third party account information that is secure. In other words, the whitelist can contain identifying information for authorized third party accounts that engage with/perform actions at the website. The whitelist can therefore include, but is not limited to, names, usernames, email addresses, IP addresses, domains, credit card information, and other identifying information linked with authorized third party accounts. Information that does not appear in the whitelist may correspond to third party accounts that have been breached by a malicious user and therefore pose a potential security vulnerability.

The computer system can access event data in the website code being tested in 804. In some implementations, block 804 can be performed before or during block 802.

In 806, the computer system can search for allowed third party accounts information in the event data based on the whitelist. In other words, the computer system can determine whether any third party account information appearing in the event data matches values in the accessed whitelist. The computer system can identify information identifying the third party account that is transmitting the data and the third party account that is receiving the data. In some implementations, the computer system can focus on determining whether the receiving third party account matches any values in the whitelist. In yet some implementations, the computer system can determine whether quantities of the data being transmitted are within expected ranges for that type of data and/or for transfers of data between the two third party accounts.

In some implementations, the whitelist can contain authorized third party account information that was collected over a predetermined period of time. For example, the whitelist can contain information for third party accounts that accessed the website over the past 3 days. One or more other predetermined periods of time can be used, such as the past 1 day, 2 days, 4 days, 5 days, 7 days, 10 days, etc. Once the predetermined period of time ends, the whitelist can be updated to include information for third party accounts that accessed the website during a next predetermined period of time that starts from when the process 800 began.

The computer system can determine whether one or more third party accounts information is present in the event data (808). In other words, the computer system can determine whether any of the third party account information identified in the event data matches value(s) in the whitelist. If the computer system determines that allowed third party accounts information is not present in the event data, the computer system can return an alert of a potential security vulnerability associated with the event data (810). Thus, the computer system determines that a third party account associated with the event data might have been breached and/or that a malicious user is encoding data using the third party account. If, on the other hand, the computer system determines that one or more third party accounts information is present, the computer system can return a notification of allowed third party accounts information (812). In some implementations, the computer system may not return any value, indication, message or notification. Instead, the process 800 can just end. If the third party accounts information is present in the event data, then the computer system can therefore determine that the event data associated with the website has been validated and the website is secure at the present time.

The process 800 can be applied to any type of domain. For example, in some implementations, any and all requests for a particular website can be received/retrieved by the computer system. The computer system can then extract all third party account information from the received requests and then compare the extracted information to a whitelist for the particular website. The computer system can then determine whether any of the requests have account information that does not match the values in the whitelist. Requests that do not match values in the whitelist can be flagged as potential security vulnerabilities and outputted as such to a user device of a security analyst or other relevant user.

FIG. 9 illustrates an example computing environment 900 in which the process 800 of FIG. 8 can be implemented to detect a security vulnerability in event data of a website. As shown, the test client device 104 (or any client computing device, as described herein), may run a website in step A. The test client device 104 can transmit event data to the web server 106 and a third party server system 904 (step B). The third party server system 904 can be a data analytics system. The third party server system 904 can also be any other type of computing system and/or service that provides content or other functionality to users of the website. For example, the third party server system 904 may be an advertisement or other digital components delivery service.

The third party server system 904 can also have third party user accounts, such as accounts 902A and 902B. The data transmitted from the test client device 104 can also be logged by the account 902A (step C). Thus, activity that occurs when the website is run at the test client device 104 can be logged or otherwise associated with the account 902A. Sometimes, however, the event data may also be exfiltrated to another account, such as the account 902B (step D).

Logging data can be transmitted to test client device 104 (step E). As described throughout this disclosure, runtime analysis of event data and website code can be performed at the client device, such as the test client device 104. The logging data can indicate what third party account is transmitting the event data (e.g., account 902A) and what third party account is receiving the event data (e.g., account 902B). The logging data can also indicate how much data is being transmitted between the two accounts, etc.

The test client device 104 can retrieve a whitelist of allowed accounts 906 for the particular website and determine whether the third party accounts 902A and/or 902N appear on the whitelist 906 (step F). As described above, the whitelist 906 can be a list of third party accounts that interacted with the website over a past predetermined period of time, such as the past 7 minutes from when the website was run in step A. In some implementations, the whitelist 906 can be a list of third party accounts that has been compiled for a longer period of time, such as a past day, several days, week, month, year, etc.

In the example of FIG. 9, the whitelist 906 includes information for third party accounts 902A, 902E, 902F, 902N, 902O, 902Q, and 902Z. The test client device 104 can determine that the third party account 902A, which logged the event data in step C, does appear on the whitelist 906. Thus, the account 902A is authorized to transmit the event data from the account 902A to other accounts. However, the account 902B does not appear on the whitelist 906. Therefore, the test client device 104 can determine that the account 902A might have been breached to divert the data to another account that is not authorized: account 902B. Since the account 902B does not appear on the whitelist 906, the test client device 104 can determine that there is a potential security vulnerability. The test client device 104 can then generate output about the determination in step G. For example, the test client device 104 can generate an alert of the potential security vulnerability, which can be outputted and presented to a user of the test client device 104 or another relevant user at another computing device. The alert can also be transmitted to one or more other systems, such as the third party server system 904 so that the system 904 can handle and address the potential security vulnerability. One or more other outputs can be generated in step G, as described throughout this disclosure.

Figure 10:
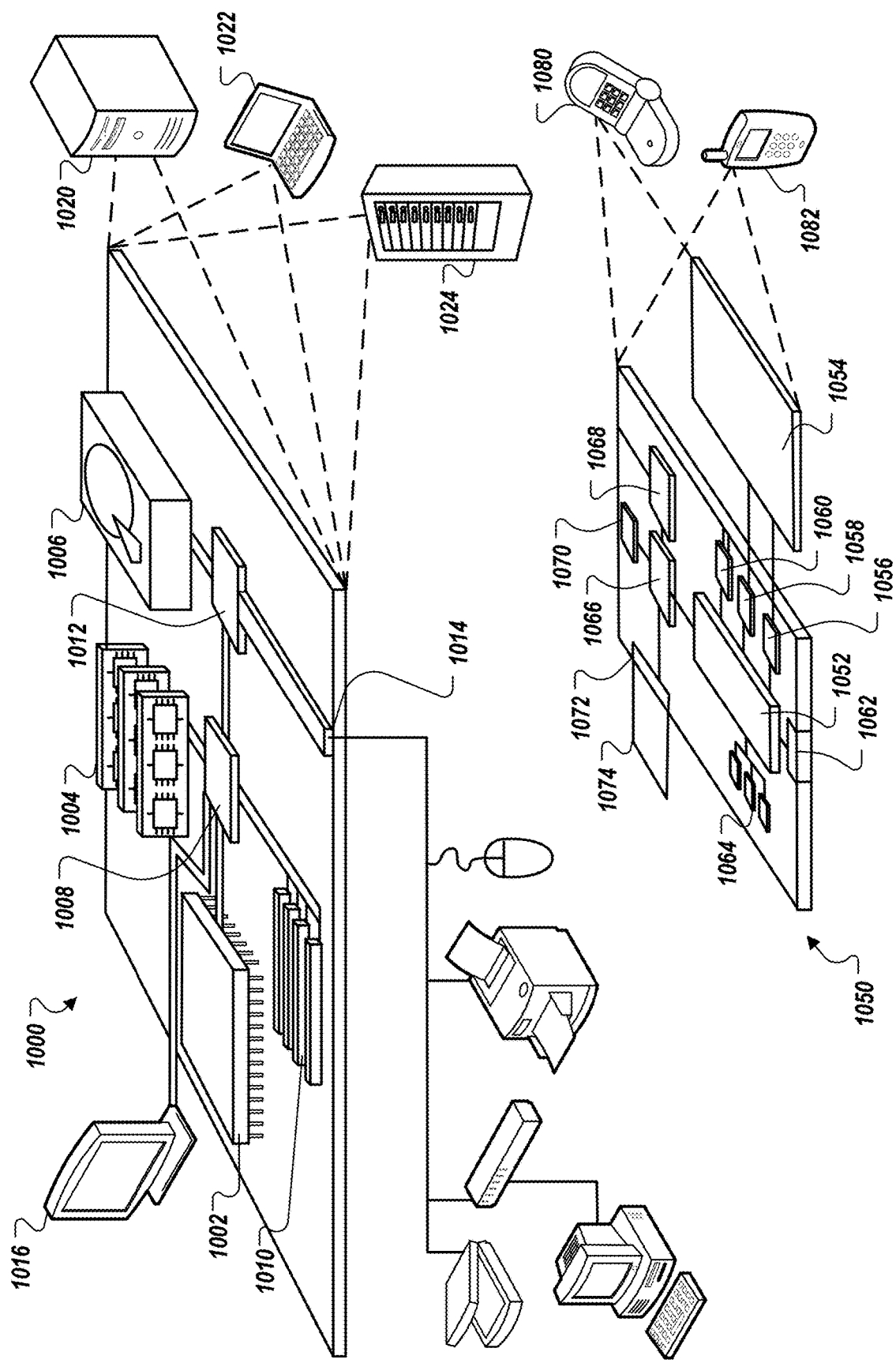
FIG. 10 is a block diagram of computing devices that may be used to implement the systems and methods described in this document.

FIG. 10 is a block diagram of computing devices 1000, 1050 that may be used to implement the systems and methods described in this document, as either a client or as a server or plurality of servers. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high-speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high-speed controller 1008 manages bandwidth-intensive operations for the computing device 1000, while the low speed controller 1012 manages lower bandwidth-intensive operations. Such allocation of functions is an example only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT (Thin-Film-Transistor Liquid Crystal Display) display or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provided, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052 that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smartphone 1082, personal digital assistant, or other similar mobile device.

Additionally computing device 1000 or 1050 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for testing a website for potential security vulnerabilities, the method comprising:
retrieving, by a client device, website code of a website;
executing, by the client device, the website code with automation script, the automation script simulating a user interaction with the website;
monitoring, by the client device, dynamic event-based behavior of the website based on a functional user flow through the website from the simulated user interaction;
generating, by the client device, event data for each of the monitored dynamic event-based behavior;
applying, by the client device, a first rule to portions of the event data that represent information transmitted from the client device by the website code to a third party device, wherein the first rule is satisfied based on identifying one or more patterns of plain text encodings in the portions of the event data;
applying, by the client device, a second rule to the portions of the event data that represent information transmitted from the client device by the website code to the third party device, wherein the second rule is satisfied based on identifying third party account information in the portions of the event data that is not included in a whitelist of allowed third party accounts information;
determining, by the client device, a likelihood of a potential security vulnerability based on at least one of the first and second rules being satisfied; and
outputting, by the client device, the likelihood of the potential security vulnerability and at least one of the associated first and second rules that were satisfied.

2. The method of claim 1, wherein applying, by the client device, a first rule to portions of the event data that represent information transmitted from the client device by the website code to a third party device comprises:
accessing a list of plain text encoding indicators;
accessing the portions of the event data;
searching for one or more indicators in the portions of the event data that match any of the plain text encoding indicators in the list; and
determining, based on identifying that at least one indicator is not present in the portions of the event data that match any of the plain text encoding indicators in the list, the likelihood of the potential security vulnerability in the website.

3. The method of claim 2, wherein the list includes a statistical spread indicating frequency of characters that appear in data transmissions for the website during a predetermined period of time.

4. The method of claim 3, wherein the characters include white spaces and tabs.

5. The method of claim 3, wherein the characters include alphanumeric characters.

6. The method of claim 3, wherein the statistical spread includes frequency of sequences of characters that appear in the data transmissions for the website during the predetermined period of time.

7. The method of claim 3, wherein the predetermined period of time is a predetermined period of time before a present time.

8. The method of claim 3, wherein searching, by the client device, for one or more indicators in the portions of the event data that matches any of the plain text encoding indicators in the list comprises determining whether a frequency of a particular character appearing in a data transmission of the portions of the event data is within a predetermined range of a frequency of the particular character in the statistical spread.

9. The method of claim 6, wherein searching, by the client device, for one or more indicators in the portions of the event data that matches any of the plain text encoding indicators in the list comprises determining whether a frequency of a particular character sequence appearing in a data transmission of the portions of the event data is within a predetermined range of a frequency of the particular character sequence in the statistical spread.

10. The method of claim 1, wherein applying, by the client device, a second rule to the portions of the event data that represent information transmitted from the client device by the website code to the third party device comprises:
accessing the whitelist of allowed third party accounts information;
accessing the portions of the event data;
searching for one or more third party accounts in the portions of the event data that match any of the allowed third party accounts information in the whitelist; and
determining, based on identifying that at least one third party account is not present in the portions of the event data that matches any of the allowed third party accounts information in the whitelist, the likelihood of the potential security vulnerability in the website.

11. The method of claim 10, further comprising determining, by the client device, whether a size of data being transmitted by the one or more third party accounts in the portions of the event data exceeds an expected threshold size of data transmissions for the website.

12. The method of claim 11, further comprising returning, by the client device and based on determining that the size of data being transmitted exceeds the expected threshold size, an alert indicating the likelihood of the potential security vulnerability in the website.

13. The method of claim 1, wherein the first and second rules are applied, by the client device, in parallel.

14. The method of claim 1, further comprising:
monitoring, by the client device, a dynamic behavior of the website;
generating, by the client device, a log of the dynamic behavior;
applying, by the client device, a first set of rules to portions of the website code and a script of the website code, wherein one or more rules in the first set of rules are satisfied based on identifying at least one of one or more patterns of encryption, obfuscation, masking, and sensitive information requests in the portions of the website code and the script of the website code;

applying, by the client device, a second set of rules to source and destination information in the log of the dynamic behavior, wherein one or more rules in the second set of rules are satisfied based on identifying at least one of one or more known bad actors and unknown actors in the source and destination information;

applying, by the client device, a third set of rules to website behavior in the log of the dynamic behavior, wherein one or more rules in the third set of rules are satisfied based on identifying at least one of one or more content security policy bypass, sensitive field event access, and script modification in the website behavior;

determining, by the client device, a likelihood of a potential malicious script based on at least one of one or more rules of the first, second, and third sets of rules being satisfied; and outputting, by the client device, the likelihood of the potential malicious script and at least one of the associated one or more rules of the first, second, and third sets of rules that were satisfied.

15. The method of claim 1, wherein executing, by the client device, the website code comprises hooking a plurality of attributes in runtime of the website.

16. The method of claim 15, wherein the plurality of attributes include one or more of IP addresses being redirected, ports accessed, ongoing requests, incoming responses, data packets being transmitted, timing of the transmission, URLs of various resources to/from which requests/responses/data are transmitted, cookies, and downloads, other events occurring as a result of executing the website, function calls, messages, and network traffic.

17. A client computing device for testing a website security anomaly, comprising:
a data processing apparatus; and
a memory device storing instructions that when executed by the data processing apparatus cause the device to perform operations comprising:
retrieving website code of a website;
executing the website code with automation script, the automation script simulating a user interaction with the website;
monitoring dynamic event-based behavior of the website based on a functional user flow through the website from the simulated user interaction;
generating event data for each of the monitored dynamic event-based behavior;
applying a first rule to portions of the event data that represent information transmitted from the client device by the website code to a third party device, wherein the first rule is satisfied based on identifying one or more patterns of plain text encodings in the portions of the event data;
applying a second rule to the portions of the event data that represent information transmitted from the client device by the website code to the third party device, wherein the second rule is satisfied based on identifying third party account information in the portions of the event data that is not included in a whitelist of allowed third party accounts information;
determining a likelihood of a potential security vulnerability based on at least one of the first and second rules being satisfied; and outputting the likelihood of the potential security vulnerability and at least one of the associated first and second rules that were satisfied.

18. The client computing device of claim 17, wherein applying a first rule to portions of the event data that represent information transmitted from the client device by the website code to a third party device comprises:
accessing a list of plain text encoding indicators;
accessing the portions of the event data;
searching for one or more indicators in the portions of the event data that match any of the plain text encoding indicators in the list; and
determining, based on identifying that at least one indicator is not present in the portions of the event data that match any of the plain text encoding indicators in the list, the likelihood of the potential security vulnerability in the website.

19. A non-transitory computer-readable medium having stored therein a program for causing a computer to execute a process of testing a website security anomaly, the process comprising:
receiving a user input of a URL of a website;
transmitting the URL to a web server to retrieve website code of the website;
receiving website code of the website from the web server, the website code including a third party script;
receiving the third party script from a third party script server different from the web server;
executing the website code with automation script;
generating simulated user inputs based on the automation script;
monitoring dynamic event-based behavior of the website based on a functional user flow through the website from the simulated user inputs;
generating event data for each of the monitored dynamic event-based behavior;
applying a first rule to portions of the event data that represent information transmitted from the client device by the website code to a third party device, wherein the first rule is satisfied based on identifying one or more patterns of plain text encodings in the portions of the event data;
applying a second rule to the portions of the event data that represent information transmitted from the client device by the website code to the third party device, wherein the second rule is satisfied based on identifying third party account information in the portions of the event data that is not included in a whitelist of allowed third party accounts information;
determining a likelihood of a potential security vulnerability based on at least one of the first and second rules being satisfied; and
outputting the likelihood of the potential security vulnerability and at least one of the associated first and second rules that were satisfied.

20. The non-transitory computer-readable medium of claim 19, wherein applying a first rule to portions of the event data that represent information transmitted from the client device by the website code to a third party device comprises:
accessing a list of plain text encoding indicators;
accessing the portions of the event data;
searching for one or more indicators in the portions of the event data that match any of the plain text encoding indicators in the list; and
determining, based on identifying that at least one indicator is not present in the portions of the event data that match any of the plain text encoding indicators in the list, the likelihood of the potential security vulnerability in the website.

\* \* \* \* \*